(12) United States Patent
Holzmueller et al.

(10) Patent No.: US 9,634,535 B2
(45) Date of Patent: Apr. 25, 2017

(54) EQUIPMENT INCLUDING EPITAXIAL CO-CRYSTALLIZED MATERIAL

(71) Applicant: Schlumberger Technology Corporation, Sugar Land, TX (US)

(72) Inventors: Jason Holzmueller, Lawrence, KS (US); William Goertzen, Siloam Springs, AR (US); Melissa Ver Meer, Overland Park, KS (US); Gregory H. Manke, Overland Park, KS (US); Patrick Z. Ma, Lawrence, KS (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 648 days.

(21) Appl. No.: 13/960,889

(22) Filed: Aug. 7, 2013

(65) Prior Publication Data

US 2014/0042835 A1    Feb. 13, 2014

Related U.S. Application Data

(60) Provisional application No. 61/682,243, filed on Aug. 11, 2012.

(51) Int. Cl.
| | | |
|---|---|---|
| *H02K 5/124* | (2006.01) | |
| *H02K 5/02* | (2006.01) | |
| *H02K 3/30* | (2006.01) | |
| *H02K 3/44* | (2006.01) | |
| *H02K 5/132* | (2006.01) | |

(52) U.S. Cl.
CPC .............. *H02K 5/124* (2013.01); *H02K 3/30* (2013.01); *H02K 3/44* (2013.01); *H02K 5/02* (2013.01); *H02K 5/132* (2013.01); *Y10T 428/31544* (2015.04)

(58) Field of Classification Search
CPC ....... E21B 43/128; H01B 3/306; H01B 3/307; H01B 3/445; F04D 13/10; H02K 3/30; H02K 3/34; H02K 15/10; H02K 5/132; H02K 5/136
USPC ................................... 310/87, 88, 62, 63, 89
See application file for complete search history.

(56) References Cited

U.S. PATENT DOCUMENTS

| | | | | |
|---|---|---|---|---|
| 4,833,354 A | * | 5/1989 | Miller | H02K 3/38 |
| | | | | 310/260 |
| 5,097,164 A | * | 3/1992 | Nakasugi | F16C 33/10 |
| | | | | 250/231.16 |
| 5,319,269 A | * | 6/1994 | Bryant | H02K 3/30 |
| | | | | 310/43 |
| 6,183,668 B1 | * | 2/2001 | Debe | C25B 9/10 |
| | | | | 204/296 |

(Continued)

OTHER PUBLICATIONS

U.S. Appl. No. 61/371,267, filed Aug. 6, 2010, Lahijani (37 pages).

(Continued)

*Primary Examiner* — Naishadh Desai
(74) *Attorney, Agent, or Firm* — Michael Stonebrook

(57) ABSTRACT

An electric submersible pump motor can include a housing; and a hermetically sealed cavity defined at least in part by the housing that includes at least one material susceptible to hydrolysis, and a polymeric material that includes epitaxial co-crystals of perfluoroalkoxy (PFA) and polytetrafluoroethylene (PTFE). Various other apparatuses, systems, methods, etc., are also disclosed.

10 Claims, 9 Drawing Sheets

(56) References Cited

U.S. PATENT DOCUMENTS

| | | | | |
|---|---|---|---|---|
| 2005/0006974 | A1* | 1/2005 | Dalrymple | H02K 3/345 310/215 |
| 2007/0051510 | A1* | 3/2007 | Veneruso | E21B 43/128 166/244.1 |
| 2007/0142547 | A1* | 6/2007 | Vaidya | E21B 33/1208 524/847 |
| 2008/0226010 | A1* | 9/2008 | Sesselmann | G21B 1/00 376/102 |
| 2008/0269408 | A1* | 10/2008 | Brothers | C08F 14/18 524/599 |
| 2009/0317264 | A1* | 12/2009 | Manke | F04B 47/06 417/53 |
| 2010/0156215 | A1* | 6/2010 | Goertzen | H02K 5/132 310/87 |
| 2012/0031607 | A1* | 2/2012 | Lahijani | C08L 27/18 166/65.1 |
| 2012/0034406 | A1 | 2/2012 | Lahijani | |
| 2013/0123429 | A1 | 5/2013 | Lahijani | |
| 2014/0027152 | A1* | 1/2014 | Holzmueller | H01B 3/445 174/113 R |

OTHER PUBLICATIONS

Lahijani et al., A new class of perfluoropolymers: High-Temperature Epitaxial Co-Crystalline (ECC) Perfluoropolymer Resins, DuPont Chemicals and Fluoroproducts, Wilmington, DE, 2011 (4 pages).

Debruijn et al., High-Pressure, High-Temperature Technologies, Oilfield Review, Autumn 2008, 46-60 (15 pages).

Ecctreme, Trademark File Documents including Brochure as Specimen for Date of First Use of Feb. 10, 2012, U.S. Appl. No. 85/395,173 (21 pages).

Dupont Ecctreme, ECA 3000 Fluoropolymer Resin Brochure, 2012 (3 pages).

Schlumberger, RedaMAX Hotline ESP Power Cables and Motolead Extensions Brochure, 2007 (2 pages).

Schlumberger, REDA Hotline High-Temperature ESP Motors Brochure, 2007 (1 page).

Dupont Zonyl PTFE Brochure and Technical Information (micrographs) 2013 (5 pages).

Search report for the equivalent GB patent application No. 1314285.6 issued on Jan. 22, 2014.

* cited by examiner

EQUIPMENT INCLUDING EPITAXIAL CO-CRYSTALLIZED MATERIAL

RELATED APPLICATIONS

This application claims the benefit of and priority to U.S. Provisional Application Ser. No. 61/682,243, filed 11 Aug. 2012, which is incorporated by reference herein.

BACKGROUND

Equipment used in the oil and gas industry may be exposed to high-temperature and/or high-pressure environments. Integrity of such equipment may depend on its operation, during in an environment, etc. Various technologies, techniques, etc., described herein pertain to equipment that includes a material that includes epitaxial co-crystals and/or equipment that includes a material that may form epitaxial co-crystals.

SUMMARY

An electric submersible pump motor can include a housing; and a hermetically sealed cavity defined at least in part by the housing that includes at least one material susceptible to hydrolysis, and a polymeric material that includes epitaxial co-crystals of perfluoroalkoxy (PFA) and polytetrafluoroethylene (PTFE). A method can include providing a motor housing that defines, at least in part, a cavity; disposing in the cavity at least one material susceptible to hydrolysis and a polymeric material that includes perfluoroalkoxy (PFA) and polytetrafluoroethylene (PTFE); filling the cavity with dielectric oil; sealing the cavity; and heating the dielectric oil to a temperature of at least about 260 degrees C. to cause epitaxial co-crystallization of the PFA and the PTFE. A polyimide tape can be coated with a polymeric material that includes perfluoroalkoxy (PFA) and polytetrafluoroethylene (PTFE). Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
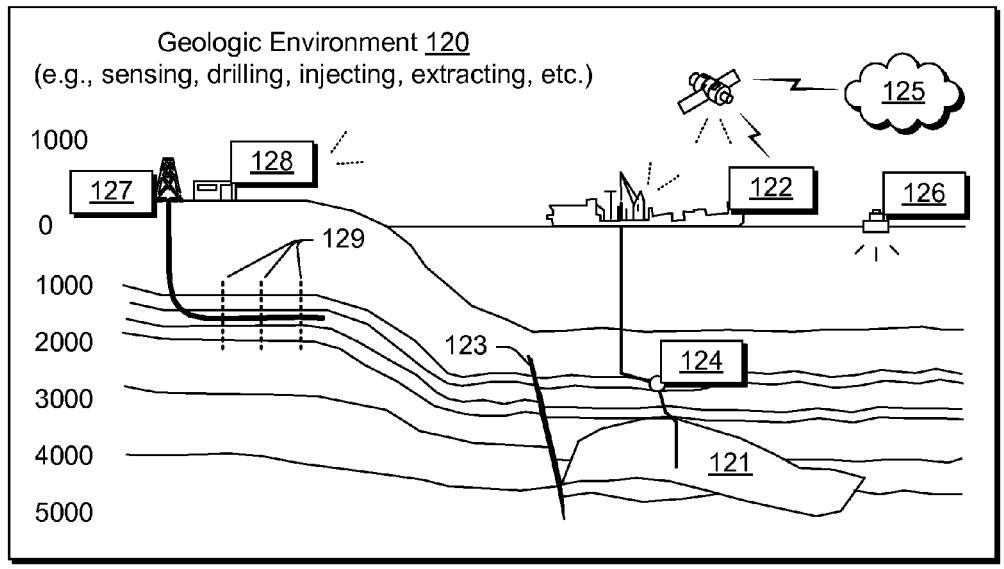
FIG. 1 illustrates examples of equipment in geologic environments.
Figure 1:
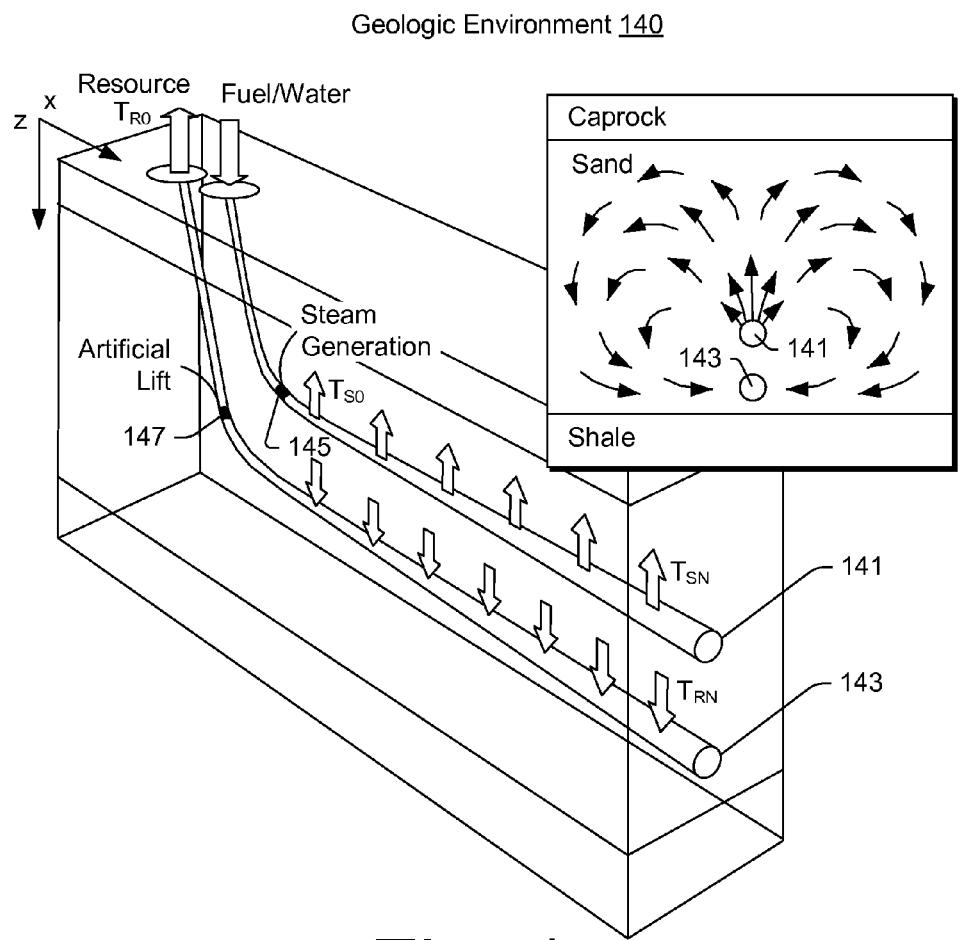

FIG. 1 shows examples of geologic environments 120 and 140. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the geologic environment 140, as shown in FIG. 1, it includes two wells 141 and 143 (e.g., bores), which may be, for example, disposed at least partially in a layer such as a sand layer disposed between caprock and shale. As an example, the geologic environment 140 may be outfitted with equipment 145, which may be, for example, steam assisted gravity drainage (SAGD) equipment for injecting steam for enhancing extraction of a resource from a reservoir. SAGD is a technique that involves subterranean delivery of steam to enhance flow of heavy oil, bitumen, etc. SAGD can be applied for Enhanced Oil Recovery (EOR), which is also known as tertiary recovery because it changes properties of oil in situ.

As an example, a SAGD operation in the geologic environment 140 may use the well 141 for steam-injection and the well 143 for resource production. In such an example, the equipment 145 may be a downhole steam generator and the equipment 147 may be an electric submersible pump (e.g., an ESP). As an example, one or more electrical cables may be connected to the equipment 145 and one or more electrical cables may be connected to the equipment 147. For example, as to the equipment 145, a cable may provide power to a heater to generate steam, to a pump to pump water (e.g., for steam generation), to a pump to pump fuel (e.g., to burn to generate steam), etc. As to the equipment 147, for example, a cable may provide power to power a motor, power a sensor (e.g., a gauge), etc.

As illustrated in a cross-sectional view of FIG. 1, steam injected via the well 141 may rise in a subterranean portion of the geologic environment and transfer heat to a desirable resource such as heavy oil. In turn, as the resource is heated, its viscosity decreases, allowing it to flow more readily to the well 143 (e.g., a resource production well). In such an example, equipment 147 may then assist with lifting the resource in the well 143 to, for example, a surface facility (e.g., via a wellhead, etc.).

As to a downhole steam generator, as an example, it may be fed by three separate streams of natural gas, air and water (e.g., via conduits) where a gas-air mixture is combined first to create a flame and then the water is injected downstream to create steam. In such an example, the water can also serve to cool a burner wall or walls (e.g., by flowing in a passageway or passageways within a wall). As an example, a SAGD operation may result in condensed steam accompanying a resource (e.g., heavy oil) to a well. In such an example, where a production well includes artificial lift equipment such as an ESP, operation of such equipment may be impacted by the presence of condensed steam (e.g., water). Further, as an example, condensed steam may place demands on separation processing where it is desirable to separate one or more components from a hydrocarbon and water mixture.

Each of the geologic environments 120 and 140 of FIG. 1 may include harsh environments therein. For example, a harsh environment may be classified as being a high-pressure and high-temperature environment. A so-called HPHT environment may include pressures up to about 138 MPa (e.g., about 20,000 psi) and temperatures up to about 205 degrees C. (e.g., about 400 degrees F.), a so-called ultra-HPHT environment may include pressures up to about 241 MPa (e.g., about 35,000 psi) and temperatures up to about 260 degrees C. (e.g., about 500 degrees F.) and a so-called HPHT-hc environment may include pressures greater than about 241 MPa (e.g., about 35,000 psi) and temperatures greater than about 260 degrees C. (e.g., about 500 degrees F.). As an example, an environment may be classified based in one of the aforementioned classes based on pressure or temperature alone. As an example, an environment may have its pressure and/or temperature elevated, for example, through use of equipment, techniques, etc. For example, a SAGD operation may elevate temperature of an environment (e.g., by 100 degrees C. or more).

As an example, an environment may be classified based at least in part on its chemical composition. For example, where an environment includes hydrogen sulfide ($H_2S$), carbon dioxide ($CO_2$), etc., the environment may be corrosive to certain materials. As an example, an environment may be classified based at least in part on particulate matter that may be in a fluid (e.g., suspended, entrained, etc.). As an example, particulate matter in an environment may be abrasive or otherwise damaging to equipment. As an example, matter may be soluble or insoluble in an environment and, for example, soluble in one environment and substantially insoluble in another.

Conditions in a geologic environment may be transient and/or persistent. Where equipment is placed within a geologic environment, longevity of the equipment can depend on characteristics of the environment and, for example, duration of use of the equipment as well as function of the equipment. For example, a high-voltage power cable may itself pose challenges regardless of the environment into which it is placed. Where equipment is to endure in an environment over a significant period of time, uncertainty may arise in one or more factors that could impact integrity or expected lifetime of the equipment. As an example, where a period of time may be of the order of decades, equipment that is intended to last for such a period of time should be constructed with materials that can endure environmental conditions imposed thereon, whether imposed by an environment or environments and/or one or more functions of the equipment itself.

Figure 2:
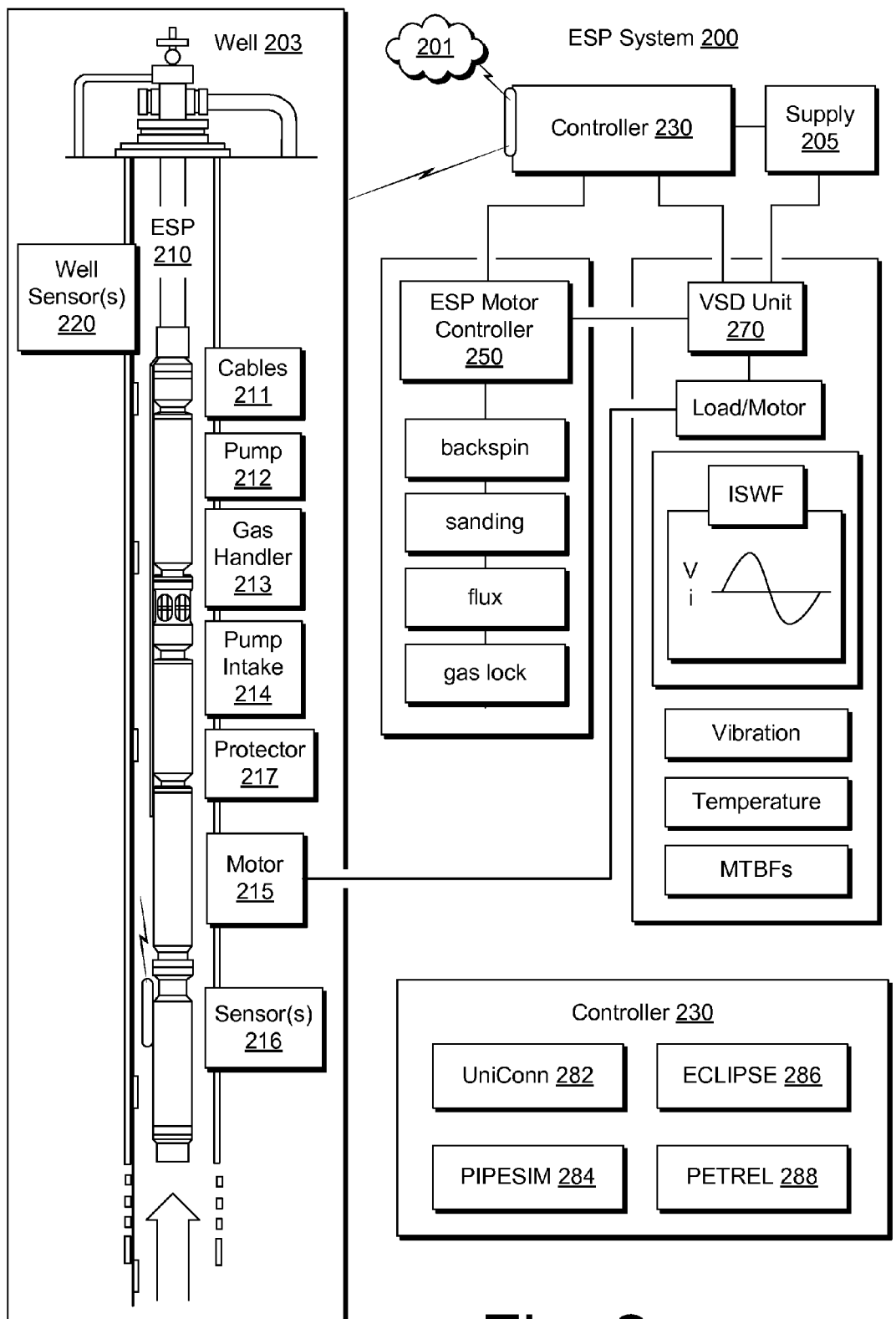
FIG. 2 illustrates an example of an electric submersible pump system.

FIG. 2 shows an example of an ESP system 200 that includes an ESP 210 as an example of equipment that may be placed in a geologic environment. As an example, an ESP may be expected to function in an environment over an extended period of time (e.g., optionally of the order of years). As an example, commercially available ESPs (such as the REDA™ ESPs marketed by Schlumberger Limited, Houston, Tex.) may find use in applications that require, for example, pump rates in excess of about 4,000 barrels per day and lift of about 12,000 feet or more.

In the example of FIG. 2, the ESP system 200 includes a network 201, a well 203 disposed in a geologic environment, a power supply 205, the ESP 210, a controller 230, a motor controller 250 and a VSD unit 270. The power supply 205 may receive power from a power grid, an onsite generator (e.g., natural gas driven turbine), or other source. The power supply 205 may supply a voltage, for example, of about 4.16 kV.

As shown, the well 203 includes a wellhead that can include a choke (e.g., a choke valve). For example, the well 203 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

As to the ESP 210, it is shown as including cables 211 (e.g., or a cable), a pump 212, gas handling features 213, a pump intake 214, a motor 215, one or more sensors 216 (e.g., temperature, pressure, current leakage, vibration, etc.) and optionally a protector 217. The well 203 may include one or more well sensors 220, for example, such as the commercially available OpticLine™ sensors or Well-Watcher BriteBlue™ sensors marketed by Schlumberger Limited (Houston, Tex.). Such sensors are fiber-optic based and can provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend thousands of feet into a well (e.g., 4,000 feet or more) and beyond a position of an ESP.

In the example of FIG. 2, the controller 230 can include one or more interfaces, for example, for receipt, transmission or receipt and transmission of information with the motor controller 250, a VSD unit 270, the power supply 205

(e.g., a gas fueled turbine generator, a power company, etc.), the network 201, equipment in the well 203, equipment in another well, etc.

As shown in FIG. 2, the controller 230 can include or provide access to one or more modules or frameworks. Further, the controller 230 may include features of an ESP motor controller and optionally supplant the ESP motor controller 250. For example, the controller 230 may include the UniConn™ motor controller 282 marketed by Schlumberger Limited (Houston, Tex.). In the example of FIG. 2, the controller 230 may access one or more of the PIPESIM™ framework 284, the ECLIPSE™ framework 286 marketed by Schlumberger Limited (Houston, Tex.) and the PETREL™ framework 288 marketed by Schlumberger Limited (Houston, Tex.) (e.g., and optionally the OCEAN™ framework marketed by Schlumberger Limited (Houston, Tex.)).

In the example of FIG. 2, the motor controller 250 may be a commercially available motor controller such as the UniConn™ motor controller. The UniConn™ motor controller can connect to a SCADA system, the espWatcher™ surveillance system, etc. The UniConn™ motor controller can perform some control and data acquisition tasks for ESPs, surface pumps or other monitored wells. The UniConn™ motor controller can interface with the Phoenix™ monitoring system, for example, to access pressure, temperature and vibration data and various protection parameters as well as to provide direct current power to downhole sensors. The UniConn™ motor controller can interface with fixed speed drive (FSD) controllers or a VSD unit, for example, such as the VSD unit 270.

For FSD controllers, the UniConn™ motor controller can monitor ESP system three-phase currents, three-phase surface voltage, supply voltage and frequency, ESP spinning frequency and leg ground, power factor and motor load.

For VSD units, the UniConn™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

The UniConn™ motor controller can include control functionality for VSD units such as target speed, minimum and maximum speed and base speed (voltage divided by frequency); three jump frequencies and bandwidths; volts per hertz pattern and start-up boost; ability to start an ESP while the motor is spinning; acceleration and deceleration rates, including start to minimum speed and minimum to target speed to maintain constant pressure/load (e.g., from about 0.01 Hz/10,000 s to about 1 Hz/s); stop mode with PWM carrier frequency; base speed voltage selection; rocking start frequency, cycle and pattern control; stall protection with automatic speed reduction; changing motor rotation direction without stopping; speed force; speed follower mode; frequency control to maintain constant speed, pressure or load; current unbalance; voltage unbalance; overvoltage and undervoltage; ESP backspin; and leg-ground.

In the example of FIG. 2, the ESP motor controller 250 includes various modules to handle, for example, backspin of an ESP, sanding of an ESP, flux of an ESP and gas lock of an ESP. As mentioned, the motor controller 250 may include any of a variety of features, additionally, alternatively, etc.

Figure 3:
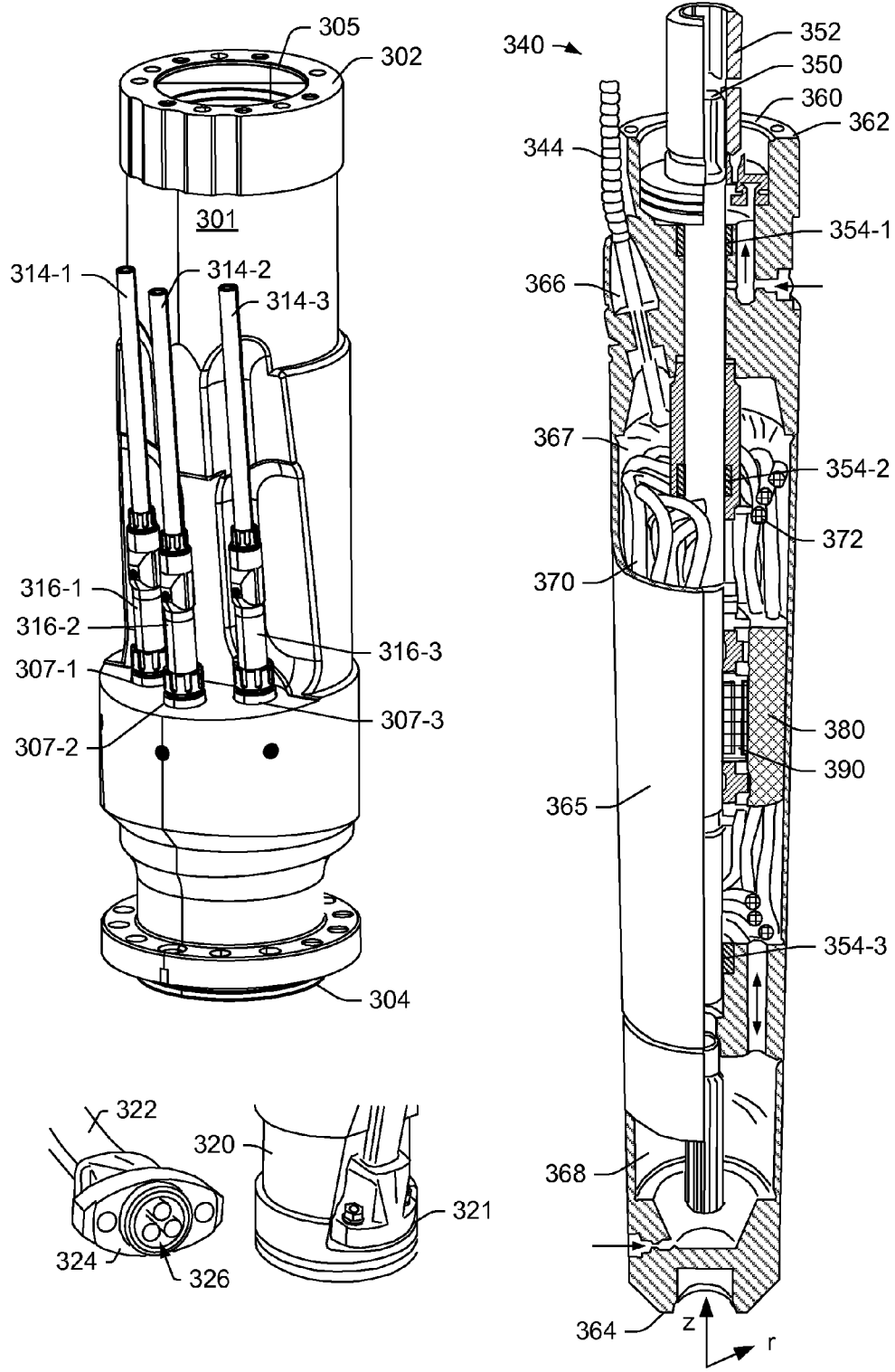
FIG. 3 illustrates examples of equipment.

In the example of FIG. 3, the VSD unit 270 may be a low voltage drive (VSD) unit, a medium voltage drive (MVD) unit or other type of unit (e.g., a high voltage drive, which may provide a voltage in excess of about 4.16 kV). For a LVD, a VSD unit can include a step-up transformer, control circuitry and a step-up transformer while, for a MVD, a VSD unit can include an integrated transformer and control circuitry. As an example, the VSD unit 270 may receive power with a voltage of about 4.16 kV and control a motor as a load with a voltage from about 0 V to about 4.16 kV.

The VSD unit 270 may include commercially available control circuitry such as the SpeedStar™ MVD control circuitry marketed by Schlumberger Limited (Houston, Tex.). The SpeedStar™ MVD control circuitry is suitable for indoor or outdoor use and comes standard with a visible fused disconnect switch, precharge circuitry, and sine wave output filter (e.g., integral sine wave filter, ISWF) tailored for control and protection of high-horsepower ESPs. The SpeedStar™ MVD control circuitry can include a plug-and-play sine wave output filter, a multilevel PWM inverter output, a 0.95 power factor, programmable load reduction (e.g., soft-stall function), speed control circuitry to maintain constant load or pressure, rocking start (e.g., for stuck pumps resulting from scale, sand, etc.), a utility power receptacle, an acquisition system for the Phoenix™ monitoring system, a site communication box to support surveillance and control service, a speed control potentiometer. The SpeedStar™ MVD control circuitry can optionally interface with the UniConn™ motor controller, which may provide some of the foregoing functionality.

In the example of FIG. 2, the VSD unit 270 is shown along with a plot of a sine wave (e.g., achieved via a sine wave filter that includes a capacitor and a reactor), responsiveness to vibration, responsiveness to temperature and as being managed to reduce mean time between failures (MTBFs). The VSD unit 270 may be rated with an ESP to provide for about 40,000 hours (5 years) of operation at a temperature of about 50 C with about a 100% load. The VSD unit 270 may include surge and lightening protection (e.g., one protection circuit per phase). With respect to operational cost, as an example, for a 373 kW load, an increase in efficiency of about 0.5% may translate into about $1,000 per year in power savings (e.g., depending on cost of power). As to leg-ground monitoring or water intrusion monitoring, such types of monitoring can indicate whether corrosion is or has occurred. Further monitoring of power quality from a supply, to a motor, at a motor, may occur by one or more circuits or features of a controller.

Overall system efficiency can affect power supply from the utility or generator. As described herein, monitoring of ITHD, VTHD, PF and overall efficiency may occur (e.g., surface measurements). Such surface measurements may be analyzed in separately or optionally in conjunction with a pump curve. VSD unit related surface readings (e.g., at an input to a VSD unit) can optionally be input to an economics model. For example, the higher the PF and therefore efficiency (e.g., by running an ESP at a higher frequency and at close to about a 100% load), the less harmonics current (lower ITHD) sensed by the power supply. In such an example, well operations can experience less loses and thereby lower energy costs for the same load.

While the example of FIG. 2 shows an ESP with centrifugal pump stages, another type of ESP may be controlled. For example, an ESP may include a hydraulic diaphragm electric submersible pump (HDESP), which is a positive-displacement, double-acting diaphragm pump with a downhole motor. HDESPs find use in low-liquid-rate coalbed methane and other oil and gas shallow wells that require artificial lift to remove water from the wellbore. A HDESP can be set above or below the perforations and run in wells that are, for example, less than about 2,500 ft deep and that produce less than about 200 barrels per day. HDESPs may handle a wide variety of fluids and, for example, up to about 2% sand, coal, fines and $H_2S/CO_2$.

As an example, an ESP may include a REDA™ Hotline high-temperature ESP motor. Such a motor may be suitable for implementation in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation.

For connection to a power cable or motor lead extensions (MLEs), a motor may include a pothead. Such a pothead may, for example, provide for a tape-in connection with metal-to-metal seals (e.g., to provide a barrier against fluid entry). A motor may include one or more types of potheads or connection mechanisms. As an example, a pothead unit may be provided as a separate unit configured for connection, directly or indirectly, to a motor housing.

As an example, a motor may include dielectric oil (e.g., or dielectric oils), for example, that may help lubricant one or more bearings that support a shaft rotatable by the motor. A motor may be configured to include an oil reservoir, for example, in a base portion of a motor housing, which may allow oil to expand and contract with wide thermal cycles. As an example, a motor may include an oil filter to filter debris.

As an example, a motor housing can house stacked laminations with electrical windings extending through slots in the stacked laminations. The electrical windings may be formed from magnet wire that includes an electrical conductor and at least one polymeric dielectric insulator surrounding the electrical conductor. As an example, a polymeric insulation layer may include a single layer or multiple layers of dielectric tape that may be helically wrapped around an electrical conductor and that may be bonded to the electrical conductor (e.g., and to itself) through use of an adhesive.

FIG. 3 shows various examples of motor equipment. A pothead unit 301 includes opposing ends 302 and 304 and a through bore, for example, defined by a bore wall 305. As shown, the ends 302 and 304 may include flanges configured for connection to other units (e.g., a protector unit at the end 302 and a motor unit at the end 304). The pothead unit 301 includes cable passages 307-1, 307-2 and 307-3 (e.g., cable connector sockets) configured for receipt of cable connectors 316-1, 316-2 and 316-3 of respective cables 314-1, 314-2 and 314-3. As an example, the cables 314-1, 314-2 and 314-3 and/or the cable connectors 316-1, 316-2 and 316-3 may include one or more polymers. For example, a cable may include polymer insulation while a cable connector may include polymer insulation, a polymer component (e.g., a bushing), etc. As an example, the cables 314-1, 314-2 and 314-3 may be coupled to a single larger cable. The single larger cable may extend to a connector end for connection to a power source or, for example, equipment intermediate the cable and a power source (e.g., an electrical filter unit, etc.). As an example, a power source may be a VSD unit that provides three-phase power for operation of a motor.

FIG. 3 also shows a pothead unit 320 that includes a socket 321. As an example, a cable 322 may include a plug 324 that can couple to the socket 321 of the pothead unit 320. In such an example, the cable 322 may include one or more conductors 326. As an example, a cable may include at least one fiber optic cable or one or more other types of cables.

Additionally, FIG. 3 shows a perspective cut-away view of an example of a motor assembly 340 that includes a power cable 344 (e.g., MLEs, etc.) to supply energy, a shaft 350, a housing 360 that may be made of multiple components (e.g., multiple units joined to form the housing 360), stacked laminations 380, windings 370 of wire (e.g., magnet wire) and a rotor 390 coupled to the shaft 350 (e.g., rotatably driven by energizing the windings 370).

As shown, the shaft 350 may be fitted with a coupling 352 to couple the shaft to another shaft. A coupling may include, for example, splines that engage splines of one or more shafts. The shaft 350 may be supported by bearings 354-1, 354-2, 354-3, etc. disposed in the housing 360.

As shown, the housing 360 includes opposing axial ends 362 and 364 with a substantially cylindrical outer surface 365 extending therebetween. The outer surface 365 can include one or more sealable openings for passage of oil (e.g., dielectric oil), for example, to lubricate the bearings and to protect various components of the motor assembly 340. As an example, the motor assembly 340 may include one or more sealable cavities. For example, a passage 366 allows for passage of one or more conductors of the cable 344 (e.g., or cables) to a motor cavity 367 of the motor assembly 340 where the motor cavity 367 may be a sealable cavity. As shown, the motor cavity 367 houses the windings 370 and the laminations 380. As an example, an individual winding may include a plurality of conductors (e.g., magnet wires). For example, a cross-section 372 of an individual winding may reveal a plurality of conductors that are disposed in a matrix (e.g., of material or materials) or otherwise bound together (e.g., by a material or materials). In the example of FIG. 3, the motor housing 360 includes an oil reservoir 368, for example, that may include one or more passages (e.g., a sealable external passage and a passage to the motor cavity 367) for passage of oil.

As explained above, equipment may be placed in a geologic environment where such equipment may be subject to conditions associated with function or functions of the equipment and/or be subject to conditions associated with the geologic environment. Equipment may experience conditions that are persistent (e.g., relatively constant), transient or a combination of both. As an example, to enhance equipment integrity (e.g., reduction in failures, increased performance, longevity, etc.), equipment may include at least one polymer composition that can undergo epitaxial co-crystallization. For example, the motor assembly 340 may include one or more materials that include or that are such a polymer composition. Such material may be for purposes of binding, for purposes of insulating, for purposes of reducing moisture content, for purposes of increasing temperature rating, etc. Such material may be for multiple purposes, for example, to bind and insulate as well as to reduce moisture content. As an example, consider inclusion of such material in a cavity, which may be a sealable cavity that may include one or more materials susceptible to hydrolysis. The inclusion of the material may reduce moisture load, for example, where it is chemically and/or structurally resistant to entraining or otherwise carrying moisture.

Figure 4:
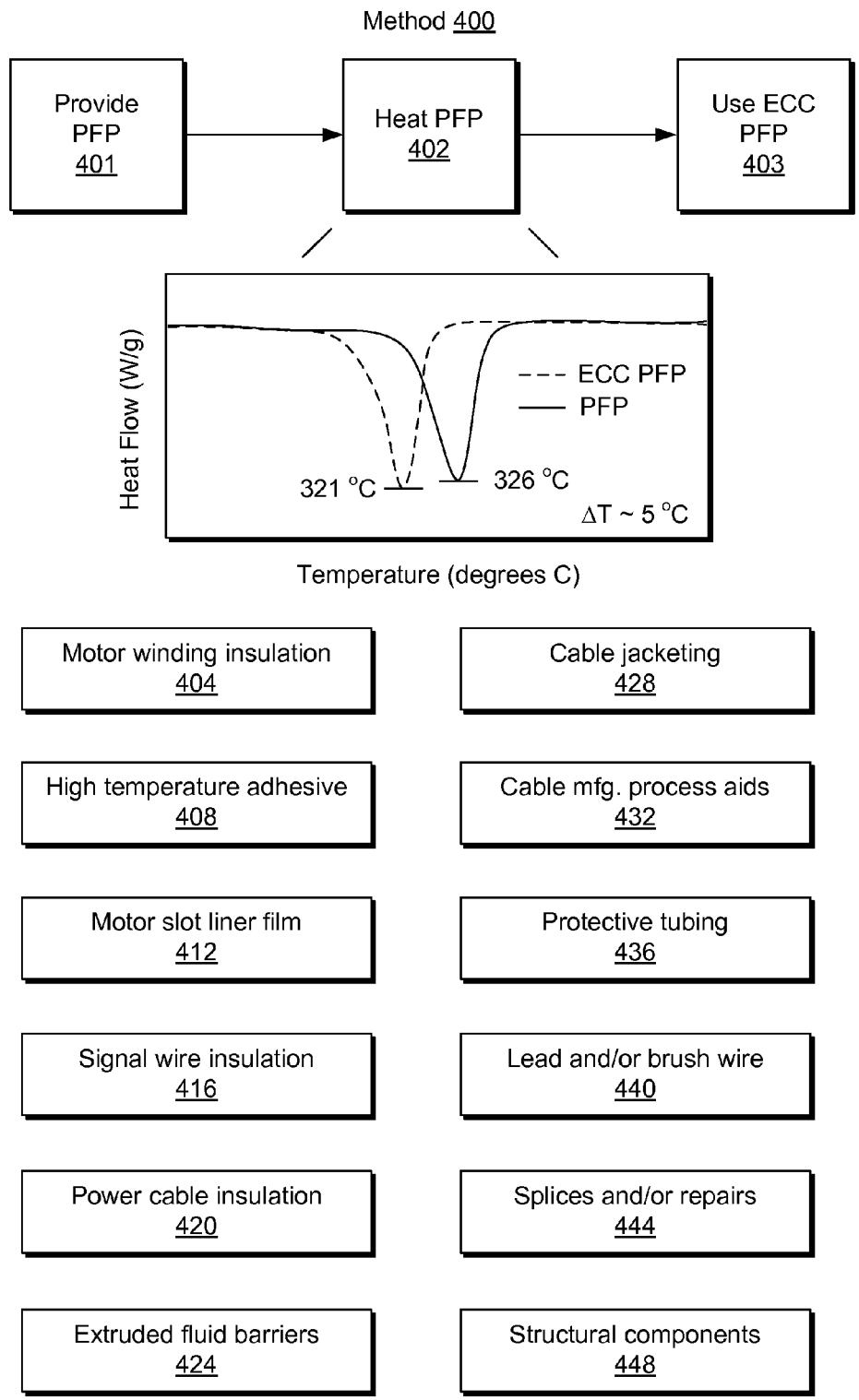
FIG. 4 illustrates an example of a method for material and various applications for the material.

FIG. 4 shows of a method 400 that includes a provision block 401 for providing a perfluoropolymer mixture (PFP), a heat block 402 for heating the PFP to promote epitaxial co-crystallization (ECC) to thereby produce an ECC PFP and a use block 403 for using the produced ECC PFP. In such an example, the heat block 402 may occur during use of the PFP, for example, where equipment with a PFP is subject to a sufficient temperature (e.g., time-temperature conditions) to promote ECC to thereby produce an ECC PFP. For example, a piece of equipment may include a component formed at least in part from a PFP where during use of the piece of equipment (e.g., optionally in a downhole environment), the component is subject to a sufficient temperature for a sufficient time to thereby promote ECC and to thereby transform at least a portion of the PFP in the component to an ECC PFP. As an example, a PFP may be heat aged in situ to form, at least in part, an ECC PFP. For example, a component that includes PFP may be heat aged after installation in an assembly to form, at least in part, a component that includes an ECC PFP.

As an example, heat aging can cause a composition that includes PFP (e.g., a perfluoropolymer mixture) to undergo epitaxial co-crystallization (ECC). For example, a composition that includes PFA and polytetrafluoroethylene, together as a PFP, may undergo ECC responsive to heat aging to form an ECC PFP. ECC may be described as a phenomenon of separate crystals of different molecules (e.g., co-polymers, etc.) becoming co-crystals such that a melting temperature is a single melting temperature that is greater than a melting temperature of, for example, one of the molecules alone. In such an example, an increase in melting temperature may indicate that crystals of one polymer (e.g., PFA) and those of a melt flowable other polymer (e.g., PTFE at low molecular weight, such as, for example, provided by a PTFE micropowder) have transformed to a different crystalline state (e.g., a co-crystalline state). As an example, co-crystallization may be a crystallographic transformation from a blend of separate crystals, for example, primarily of PFA crystals and PTFE crystals, to co-crystals of thereof.

As an example, a mixture (e.g., a composition) may include a melt-fabricable tetrafluoroethylene/perfluoro(alkyl vinyl ether) copolymer (e.g., where the perfluoroalkyl contains 1 to 5 carbon atoms) and melt flowable polytetrafluoroethylene (PTFE). As an example, a composition may be or include a commercially available DuPont™ ECCtreme® ECA 3000 fluoroplastic resin. As an example, such a resin may be a PFP that may be heat aged to become an ECC PFP. A white paper entitled "A New Class of Perfluoropolymers: High Temperature Epitaxial Co-Crystalline (ECC) Perfluoropolymer Resins", by Lahijani et al., is incorporated by reference herein (DuPont Chemicals and Fluoroproducts, Wilmington Del.) and a US Patent Application Publication No. 2012/0031607 A1, entitled "Downhole Well Communications Cable", published Feb. 9, 2012, to Lahijani and listing E.I. Du Pont de Nemours and Company (Wilmington, Del.) is incorporated by reference herein.

As an example a PFA may be a copolymer of tetrafluoroethylene (TFE) and perfluoro(alkyl vinyl ether) (PAVE), for example, where a linear or branched perfluoroalkyl group contains 1 to 5 carbon atoms. As an example, a PAVE monomer may be one or more of those in which a perfluoroalkyl group contains 1, 2, 3 or 4 carbon atoms (e.g., PMVE, PEVE, PPVE and PBVE, respectively). A copolymer may be made, for example, using several PAVE monomers, such as the TFE/perfluoro(methyl vinyl ether)/perfluoro(propyl vinyl ether) copolymer (e.g., "MFA" as PFA). As an example, identity and amount of PAVE present in PFA may be such that the melting temperature of the PFA is greater than about 300 degrees C. PFA may be referred to as a fluoroplastic rather than a fluoroelastomer, for example, where, as a fluoroplastic, PFA is semicrystalline (e.g., partially crystalline).

As an example, PFA may be sufficiently flowable in a molten state to allow for melt processing (e.g., extrusion, etc.), for example, to produce a component having a desirable strength (e.g., characterized by PFA by itself exhibiting an MIT Flex Life of at least 1000 cycles, preferably at least 2000 cycles using 8 mil (0.21 mm) thick film). As an example, a melt flow rate (MFR) of PFA (e.g., prior to heat treatment) may be at least about 0.1 g/10 min (e.g., ASTM D-1238 and ASTM D 3307-93, at 372 degrees C. using a 5 kg weight on the molten PFA).

As an example, PFA may be fluorine-treated, for example, for a stable-$CF_3$ end group as a predominant end group (e.g., less than about 50). As another example, PFA may be provided without fluorine treatment, for example, whereby its end groups may be unstable end groups arising from aqueous dispersion polymerization to form PFA.

As to polytetrafluoroethylene (PTFE), it may be characterized to be non-melt flowable, for example, where it has a high molecular weight. However, as an example, PTFE may be provided with a low molecular weight (LMW) and, as such, be characterized to be melt flowable. Such PTFE may be referred to as, for example, LMW PTFE. As an example, a LMW PTFE may be melt flowable yet, for example, not melt fabricable (e.g., by virtue of brittleness). For example, a LMW PTFE extruded fiber may break upon flexing.

As an example, LMW PTFE may be characterized as being of high crystallinity (e.g., optionally exhibiting a heat of crystallization of at least 50 J/g). As an example, LMW PTFE may be characterized as being of high crystallinity with, for example, melt flowability (e.g., flowable in a molten state).

LMW PTFE may be, for example, obtained by direct polymerization under conditions that prevent very long polymer chains from forming, by irradiation degradation of PTFE, etc.

As an example, LMW PTFE may be solid, for example, with a melting temperature of at least about 300 degrees C. (e.g., or higher).

As an example, PTFE (e.g., LMW PTFE) may be provided as "PTFE micropowder" (e.g., consider ZONYL® micropowder marketed by DuPont Company). DuPont Zonyl® fluoroadditives may be characterized as being finely divided white powders of polytetrafluoroethylene (PTFE) resin that, in comparison to Teflon® PTFE molding and extrusion powders, may be characterized as being, for example, of lower molecular weight of smaller particle size(s) (e.g., about 2 μm to about 20 μm).

As an example, proportions of PFA and PTFE (e.g., LMW PTFE, PTFE micropowder, etc.) to make a component may include an amount of PTFE, for example, to provide for an increased temperature resistance (e.g., compared to a component fabricated from mainly PFA). As an example, a composition may include at least 12 percent by weight PTFE (e.g., LMW PTFE, PTFE micropowder, etc.) or more (e.g., consider 50 percent by weight PTFE). As an example, a composition may include a percent by weight of PTFE and a remaining amount a percent by weight of PFA (e.g., PTFE % plus PFA % is approximately 100%). As an example, a single type of PTFE and a single type of PFA may be used to form a composition from which a component may be made, coated, etc. As an example, one or more additional constituents may be included in a composition (e.g., dielectric material, pigment, conductive material, non-conductive material, fiber, inorganic, etc.). As an example, a PTFE and PFA formed composition (e.g., without any appreciable additional conductive material therein) may exhibit a dielectric constant of no greater than about 2.4 (e.g., at 20 degree C.), for example, enabling the composition and the component made therefrom to be electrically insulating (e.g., electrically non-conductive).

FIG. 4 shows an example of a plot of flow versus temperature for an example of a PFP subject to heating to produce an ECC PFP where the ECC PFP has an increased temperature before flow occurs (e.g., a higher melt temperature). As an example, a PFP may become an ECC PFP that demonstrates one or more enhanced properties (e.g., modulus retention, improved fatigue resistance, better permeation resistance and higher melting point) when subjected to a post-heat treatment.

As an example, a provided PFP (e.g., as a resin) may be processed into shapes, tubes, wire coatings, etc. and, once processed and exposed to temperatures in excess of about 290 degrees C., the PFP may be transformed via epitaxial co-crystallization (ECC), for example, to alter one or more of its material properties. For example, as indicated in the plot of FIG. 4, a melt-point shift may be experienced and indicative of a co-crystallization effect. Specifically, the plot of FIG. 4 demonstrates that upon heat aging and thermal transformation, a PFP resin's melting point increases by about 5 degrees C. (e.g., PFP with a melt point of about 320±3 degrees C. as measured by differential scanning calorimetry may be increased by heat-aging at about 315 degrees C. for about 48 hours such that the PFP undergoes a thermal and structural transformation and demonstrates a melt point of about 325±3 degrees C.).

As an example, ECC may occur by heat aging at a temperature at which a composition retains its shape and does not flow, indicating that the composition is in the solid state. In such an example, shape retention may mean that the shape of a melt-fabricated article is discernible after heat aging (e.g., the article substantially retains its shape during and after heat aging).

As an example, a PFP processed to an ECC PFP may demonstrate a reduction in permeation, for example, where such processing includes exposing the PFP to temperatures of about 300 degrees C. In such an example, the ECC PFP may exhibit reduced permeation to $CH_4$, $CO_2$ and $O_2$. Higher permeation resistance, for example, resulting from changes in polymer morphology during heat treatment, may provide an ECC PFP approximating a 50% reduction in permeation over non-ECC PFPs. As an example, a PFP may exhibit relatively low permeation and an ECC PFP may exhibit a lower permeation. As an example, PFP and/or ECC PFP may carry less moisture than another marketed high-temperature material, for example, due to the PFP and/or the ECC PFP having lower permeation compared to that other marketed high-temperature material (e.g., lower permeation as to water).

In comparison to non-ECC PFPs, an ECC PFP may exhibit reduced creep (e.g., increased modulus retention), increased chemical resistance, increased flex life/stress-crack resistance, and a lower dissipation factor (e.g., when compared to a perfluoroalkoxy polymer alone (PFA)).

As to dissipation factor (DF), it may be a measure of loss-rate of energy of a mode of oscillation (e.g., mechanical, electrical, or electromechanical) in a dissipative system (e.g., the reciprocal of quality factor, which may represent quality of oscillation). As to electrical potential energy, it may be dissipated in a dielectric material, for example, in the form of heat. As an example, consider a capacitor made of a dielectric material placed between conductors. Such a capacitor may be quantified by its equivalent series resistance (ESR), which can represent losses in the capacitor (e.g., where a larger ESR indicates larger losses). The ESR of a material (e.g., in a capacitive role) may be a derived quantity with physical origins as to the material's conduction electrons and dipole relaxation phenomena. In a dielectric material, either the conduction electrons or the dipole relaxation may dominate loss.

As mentioned, an ECC PFP may exhibit a lower dissipation factor (DF) than, for example, PFA alone. For example, for a range of frequencies from about 100 Hz to about 20 GHz, an ECC PFP may exhibit a lower DF than PFA alone, especially over a range of frequencies greater than approximately 1 MHz.

As an example, a PFP may be included in one or more components, for example, for processing to form an ECC PFP. As an example, an ECC PFP may be included in one or more components (e.g., as a PFP component that has been heat aged prior to installation and/or use of the component in an assembly).

FIG. 4 shows various components and/or uses for a PFP and/or an ECC PFP. As shown, such components and/or uses may include those related to motor winding insulation 404, high temperature adhesive 408, motor slot liner film 412, signal wire insulation 416, power cable insulation 420, extruded fluid barriers 424, cable jacketing 428, cable manufacturing process aids 432, protective tubing 436, lead and/or brush wire 440, splices and/or repairs 444 and structural components (e.g., in electrical connectors, etc.).

As to motor winding insulation 404, ECC PFP has dielectric properties which make it suitable for electrical applications, for example, including motor magnet wire. As an example, the coefficient of friction of ECC PFP may enhance motor winding. For example, where a winding is of considerable length (e.g., for a motor of about 10 feet or more), a low coefficient of friction may enhance a winding process (e.g., ensure smoother fitting and tightness of coated wire). As an example, ECC PFP, begin hydrolysis resistant, may make windings less susceptible to moisture.

As an example, a winding made at least in part from an ECC PFP may introduce less moisture (e.g., water) into a motor cavity when compared to a more hygroscopic material or other material that may retain moisture (e.g., due to permeation or another phenomenon). As an example, a motor may include one or more materials susceptible to hydrolysis. In such an example, a motor assembly process may aim to reduce moisture to a minimum.

As an example, use of an ECC PFP may help to reduce moisture in a motor and thereby reduce hydrolysis or risk of hydrolysis of a material susceptible to hydrolysis in the motor. As an example, a calculation may be performed where material is assumed (e.g., or measured) as including a certain percentage of moisture. In turn, overall moisture content for materials introduced into a motor cavity may be determined. In an effort to reduce the overall moisture content, as an example, one or more components may be provided that include, at least in part, an ECC PFP (e.g., or a PFP heat ageable to produce an ECC PFP).

As to high temperature adhesive 408, polyimide films that find use in magnet wire insulation may be held in place with laminated or dispersion coated PFP-based adhesives that may be heat aged to become ECC PFP-based adhesives. As an example, PFP-based adhesive processable to an ECC PFP-based adhesive may be used as an adhesive for a polyimide tape. Coating the polyimide tape on one side or both sides with PFP or a PFP-based material may provide a barrier to moisture that may improve resistance to hydrolysis of polyimide.

As an example, a PFP and/or an ECC PFP may be provided as a coating for a material susceptible to hydrolysis. For example, a material that includes cyanate ester may be subject to hydrolysis. In such an example, the material may be coated with a PFP and heat aged to transform the PFP to an ECC PFP that acts to reduce migration of water to the material.

As an example, a PFP and/or an ECC PFP may be provided to perform, for example, two functions: (i) a moisture barrier function; and (ii) a reduction in total moisture function. For example, where a material in a piece of equipment is susceptible to moisture, it may be coated with a PFP processable to an ECC PFP to form a barrier to moisture and to reduce moisture in the equipment (e.g., when compared to another type of barrier that may carry more moisture into the equipment).

US Patent Application Publication No. 2009/0317264 A1, published Dec. 24, 2009, to Manke et al., entitled "ESP Motor Windings for High Temperature Environments" (assigned to Schlumberger Reservoirs Completions), which is incorporated by reference herein, describes an ESP system and various components thereof and one or more components that may include, for example, polyimide. As an example of a polyimide film, consider KAPTON® film (e.g., Kapton® FWR polyimide film) marketed by the company DuPont™. While the Kapton® FWR polyimide film may exhibit "improved" hydrolysis resistance, such improved resistance is described as being related to overlap (e.g., greater than 50% overlap). As an example, a film that includes polyimide may be coated (e.g., on one or both sides) with PFP or material that includes PFP, for example, to protect polyimide in the film from hydrolysis. As an example, such film may be in the form of tape, for example, where overlap may exist upon application of such film to a component. In such an example, overlap may be selected based on one or more criteria and may optionally be less than about 50%.

US Patent Application Publication No. 2010/0156215 A1, published Jun. 24, 2010, to Goertzen et al., entitled "High-Temperature Thermosetting Polymeric Materials for ESP Motor Applications" (assigned to Schlumberger Reservoirs Completions), which is incorporated by reference herein, describes an ESP system and various components thereof and one or more components that may include, for example, cyanate ester, bismaleimide, polyimide, benzoxazine, a pre-ceramic polymer, or a mixture thereof. As an example, a component may include (e.g., be formed at least in part by) cyanate ester. Cyanate ester may be susceptible to hydrolysis, for example, at elevated temperatures. As an example, PFP or a material that includes PFP may be used in conjunction with material that includes cyanate ester. As an example, PFP (e.g., optionally ECC PFP) or a material that includes PFP (e.g., optionally ECC PFP) may lower moisture content, be used as a coating, etc. to help protect cyanate ester from hydrolysis.

As an example, a piece of equipment may include one or more cavities that may be sealed (e.g., hermetically sealed). Such sealing may form one or more seals (e.g., hermetic seals) that act to reduce risk of moisture entering the cavities and causing hydrolysis of a material or materials therein. As an example, a PFP and/or an ECC PFP may be provided in a cavity prior to sealing of the cavity where, for example, the PFP may be processed via heat aging to an ECC PFP. In such an example, the ECC PFP or resulting in situ ECC PFP formed from the PFP may function as one or more of (i) a structural component, (ii) an insulator, (iii) a moisture barrier, and (iv) a component with a low moisture content. As an example, heat treatment may occur after sealing (e.g., after sealing a cavity of an ESP system), for example, where such heat treatment may occur during use, during placement, after placement, etc.

As to a motor slot liner film 412, such a film may include PFP heat ageable to form an ECC PFP or may be provided as including an ECC PFP. For example, a PFP may be formed as a film and then heat aged to be an ECC PFP-based film for use as a motor slot liner film. As an example, a motor slot liner film may be used to separate motor phases (e.g., wires, sections, etc. associated with individual phases of a multiphase motor). As an example, motor slot liner film with reduced moisture retention and/or moisture content may be used in a motor cavity to be sealed. For example, a PFP and/or an ECC PFP motor slot liner film may be introduced into a motor cavity prior to sealing of the cavity to reduce overall moisture content in the motor cavity (e.g., compared to a film that would introduce more moisture).

As to signal wire insulation 416, as an example, such insulation may be or include a PFP and/or an ECC PFP. For example, as to a PFP-based insulation, a signal wire may be provided with such insulation and then heat processed to form an ECC PFP-based insulation.

As to power cable insulation 420, an ECC PFP may exhibit a high dielectric strength, low loss and fluid resistance that make it suitable for use in or as power cable insulation. As an example, an ECC PFP may serve as a secondary insulation layer over lower profile materials such as polyimide tapes. As an example, a PFP and/or an ECC PFP may be compounded with one or more types of conductive fillers, for example, to form a semiconductive stress control layer for high voltage cable applications (e.g., voltage of about 5 kV or more). As an example, for a power cable that includes an ECC PFP-based insulator, the insulator may enhance voltage stress control layer and function as a fluid barrier (e.g., to water, hydrocarbons, etc.).

As an example, a PFP may be processed to include one or more fillers (e.g., electrically conductive and/or electrically non-conductive) and then processed to form an ECC PFP. As an example, a PFP may be processed to include one or more fillers (e.g., thermally conductive and/or insulating) and then processed to form an ECC PFP.

As to extruded fluid barriers 424, a PFP may be extruded over (e.g., directly or indirectly) a material that is lead (Pb) or that includes lead (Pb). In such an example, the extruded PFP may be heat aged to form an ECC PFP that can act as a barrier to protect the material that is lead (Pb) or that includes lead (Pb). As an example, such an approach may be applied to form a protective layer for power cable, wireline cables or as a moisture protection layer for magnet wire.

When compared to a PTFE tape barrier, an extrusion process that extrudes a PFP heat ageable to form an ECC PFP may be faster and form a more complete barrier (e.g., rated to about 550 degrees F. or about 288 degrees C.). In such an example, the extruded material may bond as a cohesive layer onto another layer (e.g., as an extruded, continuous tube). As an example, a PFP coating that can be processed to form an ECC PFP coating may help protect an underlying material from chemical attack (e.g., moisture, hydrocarbon, corrosive gas, etc.).

As to cable jacketing 428, a cable may be jacketed with a PFP and/or an ECC PFP. As an example, a cable may be coated with a PFP and/or an ECC PFP tape, coated with a PFP extruded layer that can be heat processed to form an ECC PFP layer, etc. As an example, PFP may be provided as a compound with one or more reinforcing fillers, for example, to increase mechanical strength, increase abrasion resistance, reduce gas permeability, increase tear resistance, etc.

As an example, as a fluid barrier an extruded layer of a PFP heat processable to form an ECC PFP may have a thickness of about 2 mils to about 10 mils. As an example, for a cable jacket, a thickness may be up to about 60 mils or more, for example, over insulation on a round cable to fill interstices. In such an example, the cable that is jacketed may include an ECC PFP fluid barrier over each individual conductor in the cable. As an example, an armor layer may be positioned over a PFP layer processable to form an ECC PFP and/or over an ECC PFP layer.

As to cable manufacturing process aids 432, a PFP processable to an ECC PFP may be included in a material as a processing aid, for example, to aid an extrusion process. As an example, thin extruded layers of PFP may be used as a high temperature/high performance replacement for a polyester braid material that finds use as a covering for lead (Pb) jackets (e.g., where the purpose of the braid is to protect the lead (Pb) from being damaged during armoring). In such an example, a thin extruded layer of a PFP heat ageable to an ECC PFP could provide such protection while also serving as an additional fluid barrier.

Lead (Pb) is a soft metal that can be susceptible to mechanical and chemical forces. As an example, a PFP may be applied to a lead (Pb) layer or a material that includes lead (Pb) and then heated to form an ECC PFP that reduces risk of mechanical and/or chemical damage to the lead (Pb) layer or the material that includes lead (Pb). As an example, such a method may be performed prior to armoring of a cable such that the lead (Pb) or material that includes lead (Pb) is protected against stresses that may be imposed during the armoring process. For example, a process may include providing a lead-based layer, applying a PFP over the lead-based layer, heat aging the PFP to form an ECC PFP, and installing an armor layer over the ECC PFP where the ECC PFP helps to protect the lead-based layer from mechanical and/or other damaging forces associated with the installing of the armor.

As an example, a cable can include a conductor, a lead-based layer and an ECC PFP-based layer disposed over the lead-based layer. In such an example, the ECC PFP-based layer may be disposed directly over the lead-based layer. As an example, a cable can include a conductor, a lead-based layer and a PFP-based layer disposed over the lead-based layer where the PFP-based layer may be heat aged to form an ECC PFP-based layer. In such an example, the PFP-based layer may be disposed directly over the lead-based layer.

As to protective tubing 436, a PFP and/or an ECC PFP may be used to form protective tubing, for example, for use in one or more applications such as, for example, internal motor components like magnet wire leads, splices, and brush wire leads. Various types of components may be formed of PFA alone or PTFE. PFA may have a temperature rating for such components of about 500 degrees F. (e.g., about 260 degrees C.) while PTFE may have a temperature rating for such components of about 550 degrees F. (e.g., about 288 degrees C.). As an example, an ECC PFP may have a temperature rating for such components of about 550 degrees F. (e.g., about 288 degrees C.) while providing for some material properties akin to PFA.

As to lead and/or brush wire 440, such wire may include insulation that is PFP-based and/or ECC PFP-based. As to PFP-based insulation, such insulation may be processed using heat to form an ECC PFP-based insulation. As an example, used of an ECC PFP-based insulation in such wire may enhance function by enhancing flexibility and electrical properties, for example, when compared to a polyimide-based insulation (e.g., which may be subject to hydrolysis and stiffer).

As to splices and/or repairs 444, processability of a PCP material can allow for in situ injection molded splices between cables or repairs of existing fluoropolymer cables or cables that include ECC PFP. As an example, pressure sensitive tape adhesives may be limited in their upper temperature limits (e.g., to about 260 degrees C.) because of the use of silicone or acrylic adhesives; whereas, an ECC PFP-based splice or repair may extend the application range through the use of a splice or repair without any adhesive tape.

As an example, a PFP may be provided to form a splice or to repair a defect in a manufactured cable or component, which may be in the field, in a factory or other location. As an example, a PFP may be extruded or inject at a temperature of about 650 degrees F. to about 700 degrees F. for purposes of melt and flow (e.g., about 343 degrees C. to about 371 degrees C.). As to a splice, cable ends may be stripped to their conductive cores, the cores cold welded and then a PFP introduced as a coating (e.g., via an injection mold process) about the cold welded cores and, for example, adjoining neighboring ECC PFP (e.g., or PFP prior to its heat aging). In such an example, a continuous layer may be formed about the cold welded cores, which may physically adjoin adjacent layers.

As an example, two components may be joined where a labyrinth is defined between the two components. For example, consider a labyrinth joint that includes a metal spring that energizes seals that may be made of PTFE. In such an example, a PFP may be injected into a labyrinth space and heat processed to form an ECC PFP.

As to structural components (e.g., in electrical connectors) 448, as an example, a PFP may can be compounded with one or more fillers to create a high strength, high dielectric strength part that exhibits fluid and temperature resistance. As an example, such a part may be an electrical connector component.

As to power cables suitable for downhole operations, as an example, a round ESP cable rated for operation up to about 5 kV can include one or more copper conductors, oil and heat resistant EPDM rubber insulation (e.g., where The E refers to ethylene, P to propylene, D to diene and M refers to a classification in ASTM standard D-1418; e.g., ethylene copolymerized with propylene and a diene), a barrier layer (e.g., lead/fluoropolymer or none for low cost cables), a jacket (e.g., oil resistant EPDM or nitrile rubber), and armor (e.g., galvanized or stainless steel or MONEL® alloy marketed by Inco Alloys International, Inc., Huntington, W. Va.). As another example, a flat ESP cable for operation up to about 5 kV can include one or more copper conductors, oil and heat resistant EPDM rubber insulation, a barrier layer (e.g., lead/fluoropolymer or none for low cost cables), a jacket layer (oil resistant EPDM or nitrile rubber or none for low cost cables), and armor (galvanized or stainless steel or MONEL® alloy marketed by Inco Alloys International, Inc., Huntington, W. Va.).

As an example, the aforementioned round ESP cable and flat ESP cable may include a PFP heat ageable to form an ECC PFP and/or an ECC PFP (e.g., made by heat aging a PFP). As an example, such materials may be substituted, at least in part, for the EPDM rubber insulation, be provided as a barrier layer for lead (Pb), etc. As an example, a cable may be formed using a PFP heat ageable to form an ECC PFP and/or an ECC PFP that may be rated above about 5 kV.

As an example of a RedaMAX™ Hotline™ ESP power cable, a 5 kV round ELBE G5R can include solid conductor sizes of about #1 AWG (e.g., 1 AWG/1), about #2 AWG (e.g., 2 AWG/1) and about #4 AWG (e.g., 4 AWG/1). As to conversion to metric, #1, #2 and #4 AWG correspond to approximately 42.4 mm$^2$, 33.6 mm$^2$, and 21.1 mm$^2$, respectively. As another example, a 5 kV flat EHLTB G5F can include a solid conductor size of #4 AWG (e.g., 4 AWG/1). As an example, dimensions may be, for round configurations, about 1 to 2 inches in diameter and, for flat configurations, about half an inch by about 1 inch to about 2 inches. As an example, weights may range from about 1 lbm/ft to about 3 lbm/ft. As an example, the aforementioned round ESP cable and flat ESP cable may include a PFP heat ageable to form an ECC PFP and/or an ECC PFP (e.g., made by heat aging a PFP).

Figure 5:
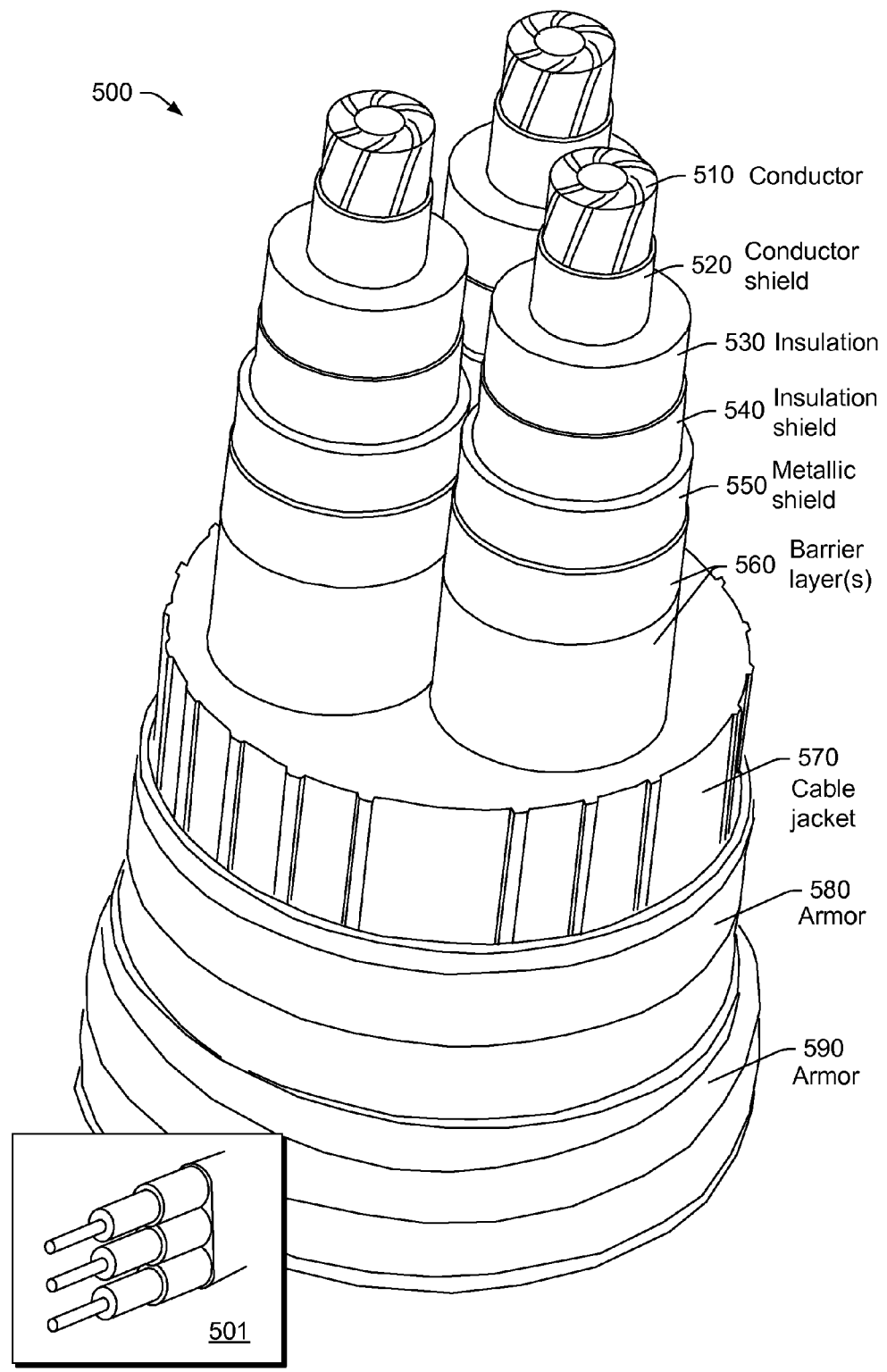
FIG. 5 illustrates an example of a power cable.

FIG. 5 shows an example of a power cable 500, suitable for use in the ESP system 200 of FIG. 2 or optionally one or more other systems (e.g., SAGD, etc.). In the example of FIG. 5, the power cable 500 includes three conductor assemblies where each assembly includes a conductor 510, a conductor shield 520, insulation 530, an insulation shield 540, a metallic shield 550, and one or more barrier layers 560. The three conductor assemblies are seated in a cable jacket 570, which is surrounded by a first layer of armor 580 and a second layer of armor 590.

As to the conductor 510, it may be solid or compacted stranded high purity copper and coated with a metal (e.g., tin, lead, nickel, silver or other metal or alloy). As to the conductor shield 520, it may be a semiconductive material with a resistivity less than about 5000 ohm-m and be adhered to the conductor 510 to reduce or eliminate voids therebetween. As an example, the conductor shield 520 may be provided as an extruded polymer (e.g., a polymer mixture) that penetrates into spaces between strands of the stranded conductor 510. As to extrusion of the conductor shield 520, it may optionally be co-extruded or tandem extruded with the insulation 530. As an option, nanoscale fillers may be included for low resistivity and suitable mechanical properties (e.g., for high temperature thermoplastics).

As to the Insulation 530, it may be bonded to the conductor shield 520. As an example, the insulation 530 may include a PFP that is heat ageable to form an ECC PFP.

As to the insulation shield 540, it may be a semiconductive material having a resistivity less than about 5000 ohm-m. The insulation shield 540 may be adhered to the insulation 530, but, for example, removable for splicing, without leaving any substantial amounts of residue. As an example, the insulation shield 540 may be extruded polymer, for example, co-extruded with the insulation 530.

As to the metallic shield 550, it may be or include lead (Pb), as lead tends to be resistant to downhole fluids and gases. One or more lead layers may be provided, for example, to create an impermeable gas barrier.

As to the barrier 560, it may include PTFE fluoropolymer, for example, as tape that may be helically taped. As an example, the barrier 560 may be formed using a PFP that is heat ageable to form an ECC PFP.

As to the cable jacket 570, it may be round or as shown in an alternative example, rectangular (e.g., "flat"). As to material of construction, a cable jacket may include one or more layers of EPDM, nitrile, HNBR, fluoropolymer, chloroprene, or other material (e.g., to provide for resistance to a downhole and/or other environment). As an example, each conductor assembly phase may include solid metallic tubing, such that splitting out the phases is more easily accomplished (e.g., to terminate at a connector, to provide improved cooling, etc.). As an example, the cable jacket 570 may be formed using a PFP that is heat ageable to form an ECC PFP.

As to the cable armor 580 and 590, metal or metal alloy may be employed, optionally in multiple layers for improved damage resistance.

Figure 6:
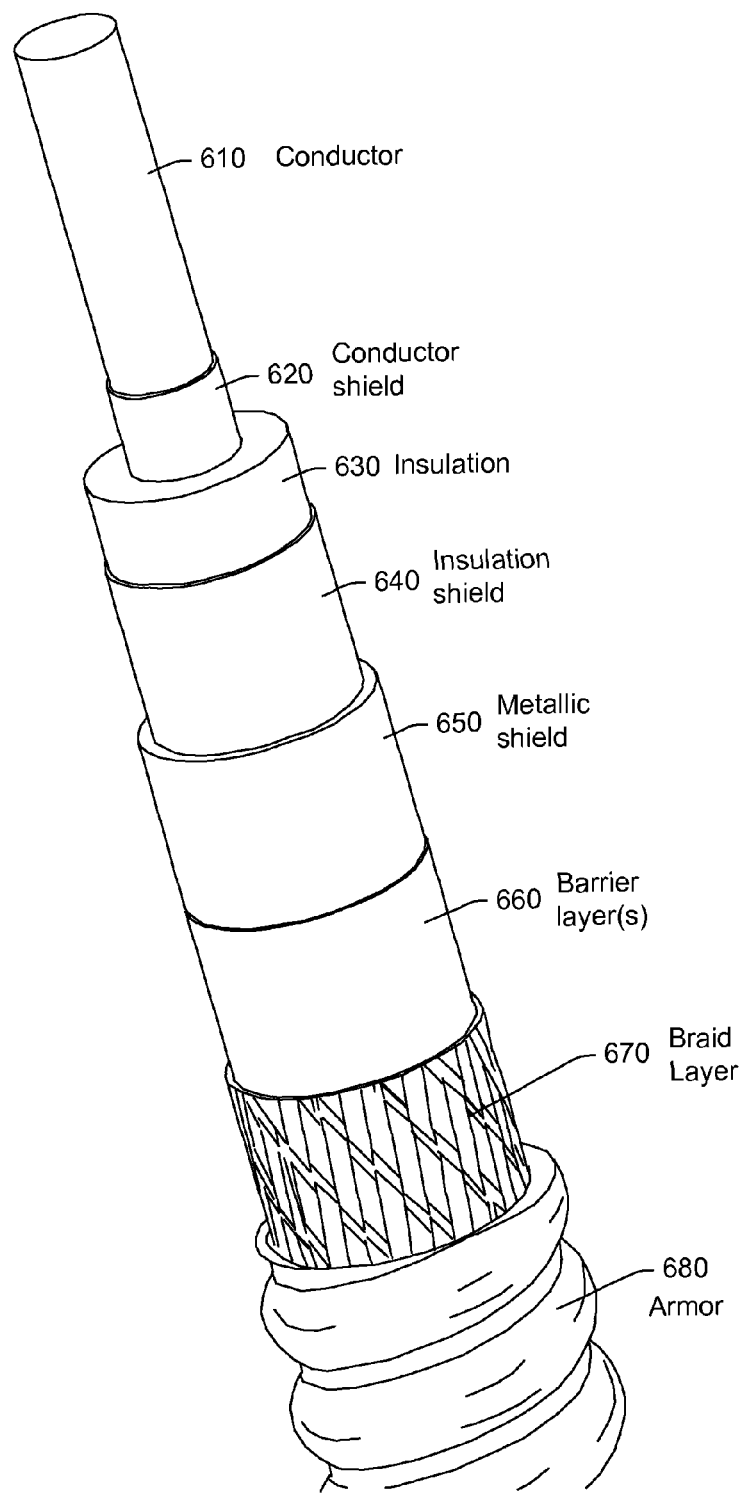
FIG. 6 illustrates an example of a motor lead extension.

FIG. 6 shows an example of one of the MLEs 600 suitable for use in the system 200 of FIG. 2 or optionally one or more other systems (e.g., SAGD, etc.). In the example of FIG. 6, the MLE 600 (or "lead extension") a conductor 610, a conductor shield 620, insulation 630, an insulation shield 640, a metallic shield 650, one or more barrier layers 660, a braid layer 670 and armor 680. While the example of FIG. 6 mentions MLE or "lead extension", it may be implemented as a single conductor assembly cable for any of a variety of downhole uses.

A power cable for artificial lift equipment can include one or more conductor assemblies, each including a copper conductor (e.g., solid, stranded, compacted stranded, etc.), a conductor shield with resistivity less than about 5000 ohm-m surrounding the conductor, an insulation, an insulation shield having a resistivity less than 5000 ohm-m surrounding the insulation, a metallic shield surrounding the insulation shield, and a polymer barrier surrounding the metallic shield. Such a cable may include a jacket molded about the one or more conductor assemblies and optionally armor surrounding the jacket. As an example, a cable that may be rated for use at over 5 kV may include one or more of a semiconductive conductor shield and a semiconductive insulation shield.

A power cable for downhole equipment can include a copper conductor (e.g., optionally solid); a conductor shield with resistivity less than about 5000 ohm-m surrounding the conductor; insulation (e.g., optionally a PFP heat ageable to form an ECC PFP); an insulation shield having a resistivity less than about 5000 ohm-m surrounding the insulation; a metallic shield surrounding the insulation shield; a polymer barrier surrounding the metallic shield; a braided layer surrounding the metallic shield; and armor surrounding the braided layer.

As to a braid of a braided layer, various types of materials may be used such as, for example, polyethylene terephthalate (PET) (e.g., applied as a protective braid, tape, fabric wrap, etc.). PET may be considered as a low cost and high strength material. As an example, a braid layer can help provide protection to a soft lead jacket during an armor wrapping process. In such an example, once downhole, the function of the braid may be minimal. As to other examples, nylon or glass fiber tapes and braids may be implemented. Yet other examples can include fabrics, rubberized tapes, adhesive tapes, and thin extruded films. As an example, the braid layer 670 may be formed using a PFP that is heat ageable to form an ECC PFP. As an example, a layer may be formed over the braid layer 670, for example, using a PFP that is heat ageable to form an ECC PFP. As an example, such a layer may be extruded. Upon heat aging to form an ECC PFP, such a layer may help to protect one or more other layers during an armoring process, for example, that applies the armor 680.

As an example, a conductor (e.g., solid or stranded) may be surrounded by a semiconductive material layer that acts as a conductor shield where, for example, the layer has a thickness greater than approximately 0.005 inch. As an example, a cable can include a conductor with a conductor shield that has a radial thickness of approximately 0.010 inch. As an example, a cable can include a conductor with a conductor shield that has a radial thickness in a range from greater than approximately 0.005 inch to approximately 0.015 inch.

As an example, a conductor may have a conductor size in a range from approximately #8 AWG (e.g., OD approx. 0.128 inch or area of approx. 8.36 mm$^2$) to approximately #2/0 "00" AWG (e.g., OD approx. 0.365 inch or area of approx. 33.6 mm$^2$). As examples, a conductor configuration may be solid or stranded (e.g., including compact stranded). As an example, a conductor may be smaller than #8 AWG or larger than #2/0 "00" AWG (e.g., #3/0 "000" AWG, OD approx. 0.41 inch or area of approx. 85 mm$^2$).

As an example, one or more layers of a cable may be made of a material that is semiconductive (e.g., a semiconductor). Such a layer (e.g., or layers) may include a polymer or polymer blend with one or more conductive fillers (e.g., carbon black, graphene, carbon nanotubes, etc.) and optionally one or more additives (e.g., elastomer compound components, process aids, etc.). As an example, a layer may include a PFP heat ageable to form an ECC PFP and a graphite filler (e.g., expanded graphite, etc.). For example, a layer may include a PFP as a thermoplastic heat ageable to form an ECC PFP and a graphite filler (e.g., expanded graphite, etc.).

As an example, a cable may include a conductor that has a size within a range of approximately 0.1285 inch to approximately 0.414 inch and a conductor shield layer that has a radial thickness within a range of approximately greater than 0.005 inch to approximately 0.015 inch.

As an example, a cable may include a conductor with a conductor shield (e.g., a semiconductor layer) and insulation (e.g., an insulation layer) where the conductor shield and the insulation are extruded. For example, the conductor shield may be extruded onto the conductor followed by extrusion of the insulation onto the conductor shield. Such a process may be performed, for example, using a co-extrusion, a sequential extrusion, etc. As an example, a shield and/or insulation may be formed using a PFP that is heat ageable to form an ECC PFP.

As an example, insulation may include one layer or multiple layers of a high temperature polymeric dielectric material. As an example, polymeric insulating material may be in the form of tape that may be applied helically or longitudinally (e.g., by wrapping polyimide tape onto a conductor in an overlap configuration).

As an example, multiple layers may be applied to a conductor (e.g., directly or indirectly). As an example, a thickness of a polymer insulator layer may be from about 0.0005 inch to about 0.005 inch. As an example, a polymer insulator layer may be a polyimide film, for example, optionally coated on one side or both sides (e.g., directly and/or indirectly) with a material that may be heat aged. As an example, a PFP may be coated onto one side or both sides of a polyimide material and subsequently heat aged to form an ECC PFP coating.

As an example, a polymer insulator may be commercially available (e.g., consider various polymers marketed under the mark DuPont™). As to a polyimide, as an example, the DuPont™ polymer 150PRN411 may be used as polymer insulation; where "150" indicates a 1.5 mils overall tape thickness, where "PRN" indicates an HN polyimide film with a high temperature fluoropolymer adhesive, where "4" indicates a 0.0004 inch thick high temperature adhesive on the bottom side of the tape, where the first "1" indicates the thickness of the polyimide film and where the second "1" indicates a 0.0001 inch thick high temperature adhesive on the top side of the tape.

As an example, polyimide may be deposited via an extrusion process. As an example, polyimide may be co-extruded with another material such as, for example, a PFP-based material.

As an example, a cable may include a conductor shield, insulation and an insulation shield that have been extruded separately (e.g., by separate extruders with a delay to allow for hardening, etc.). As an example, a cable may include a conductor shield, insulation and insulation shield formed via co-extrusion, for example, using separate extrusion bores that feed to an appropriate cross-head, extrusion die or dies that deposit the layers in a substantially simultaneous manner (e.g., within about a minute or less).

As an example, an extrusion process may be controlled to allow for some amount of intermixing at an interface between two layers, for example, to provide for more complete bonding between the two layers. For example, as a conductor shield/insulation interface may be subject to high levels of electrical stress, an extrusion process may be performed to minimize defects, voids, contamination, etc., via intermixing at the interface (e.g., via co-extrusion of the two layers). As to an insulation shield, as mentioned, ease of removal may be beneficial when making connections. Further, electrical stresses tend to diminish for layers positioned outside of an insulation layer.

In comparison to tape, extrusion may provide for a reduction in the overall dimension of a cable (e.g., in some oil field applications, well clearance may be a concern). Extruded layers tend to be smoother than tape, which can help balance out an electrical field. For example, a tape layer or layers over a conductor can have laps and rough surfaces that can cause voltage stress points. Taping for adjacent layers via multiple steps may risk possible contamination between the layers. In contrast, a co-extrusion process may be configured to reduce such contamination. For example, co-extrusion may help to eliminate voids, contamination, or rough spots at a conductor shield/insulation interface, which could create stress points where discharge and cable degradation could occur. Thus, for improved reliability, smoothness and cleanness, a conductor shield may be extruded, optionally co-extruded with insulation thereon.

Figure 7:
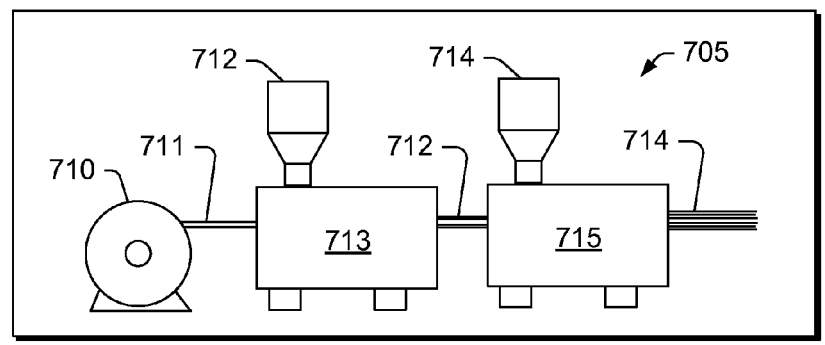
FIG. 7 illustrates examples of methods and examples of cables.
Figure 7:
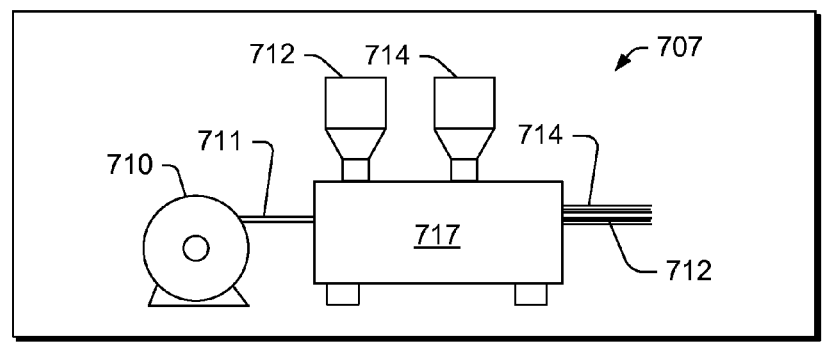
Figure 7:
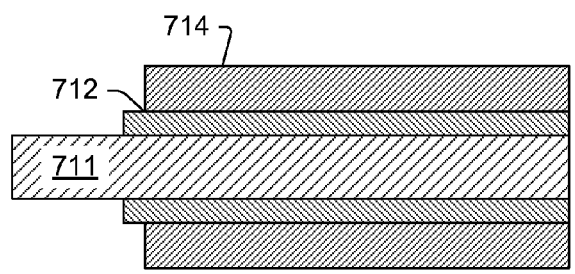
Figure 7:
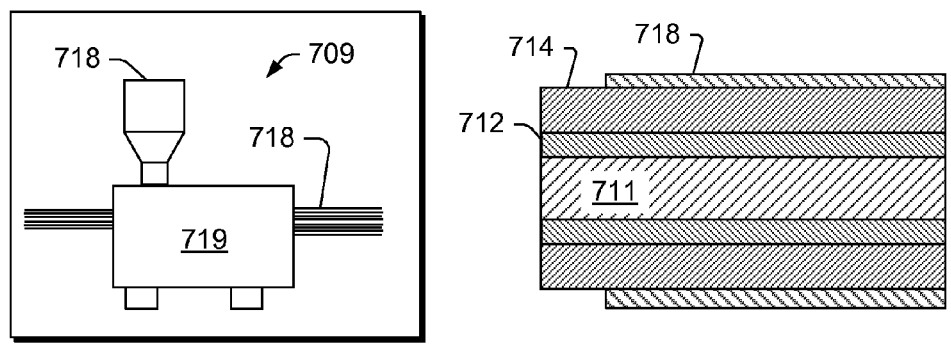

FIG. 7 shows example methods 705, 707 and 709 for extruding material as part of a cable manufacturing process. The method 705 includes providing a spool 710 with a conductor 711 carried thereon, providing material 712 for an extruder 713 and providing material 714 for an extruder 715. As shown, in the method 705, the conductor 711 is feed from the spool 710 to the extruder 713 which receives the material 712 (e.g., in a solid state), melts the material 712 and deposits it onto the conductor 711. Thereafter, the conductor 711 with the material 712 deposited thereon is feed to the extruder 715, which receives the material 714 (e.g., in a solid state), melts the material 714 and deposits it onto the material 712.

As to the method 707, an extruder 717 provides for co-extrusion of the materials 712 and 714 onto the conductor 711 as received from the spool 710. As mentioned, a co-extrusion process may include multiple extruder bores and a cross-head, die, dies, etc. to direct molten material onto a conveyed conductor (e.g., which may be bare or may have one or more layers deposited therein). In the methods 705 and 707, the material 712 may be a semiconductor to form a conductor shield and the material 714 may be an insulator to form insulation over the conductor shield. As an example, the materials 712 and 714 may be selected to allow for some amount of cross-linking at their interfaces upon deposition (e.g., in part facilitated by heat energy imparted via extrusion).

FIG. 7 shows a cross-section of an example of a cable as produced by the method 705 or the method 707 as including a conductor 711, a conductor shield 712 and insulation 714. As an example, one or more other components may be fabricated via extrusion where, for example, a cross-section may exhibit multiple layers where at least one layer includes a composition that may undergo or has undergone epitaxial co-crystallization.

Figure 8:
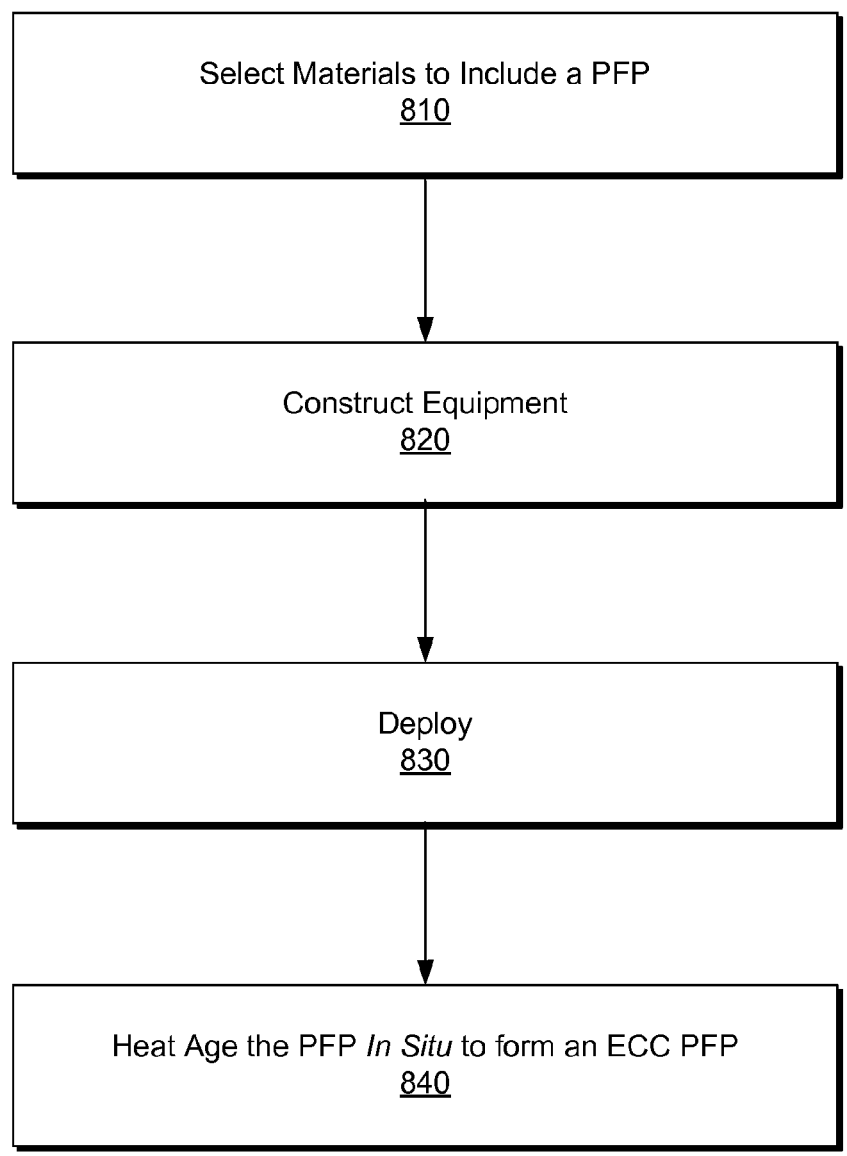
FIG. 8 illustrates an example of a method.

FIG. 8 shows a block diagram of a method 800. The method 800 includes a selection block 810 for selection of materials where the materials include a PFP. In the method 800, a construction block 820 provides for constructing a piece of equipment, an assembly, etc. using the selected materials. As an example, such a block may include one or more extrusion or other processes. In the method 800, a deployment block 830 provides for deploying the constructed equipment, for example, in a geologic environment, and a heat age block 840 provides for heat aging the PFP to form an ECC PFP in situ in the geologic environment (e.g., due to heat energy from use of the equipment, from use of other equipment and/or from the geologic environment).

As an example, an example cable (Cable ECC) was constructed that included a PFP that was heat aged to form an ECC PFP and trials were performed to compare it to another cable (e.g., an EPDM cable that was rated to about 450 degrees F. or about 232 degrees C., referred to as Cable EPDM). Trials noted AC breakdown strength before and after aging 28 days at about 550 degrees F. (e.g., about 288 degrees C.) and about 572 degrees F. (e.g., about 300 degrees C.). The results indicate that for both temperatures, Cable EPDM degradation while Cable ECC appeared to improve somewhat; noting that the initial breakdown strength was lower, but still well above the 5 kV cable rating. The results also included partial discharge inception voltage (Vi) and extinction voltage (Ve) values, which indicate the voltage at which discharge begins to occur in a cable. If the insulation has defects, such defects may cause discharge, which causes further damage to the insulation until it eventually fails. As an example, it may be desirable to have Vi to be greater than a cable's rated voltage (e.g., higher is better). As to the trial results, the Cable ECC was better than the Cable EPDM, for example, as data indicated that PD voltages increased with aging for the Cable ECC. These trial data indicate that a cable that includes PFP that is heat ageable or that has been heat aged (e.g., to form at least some epitaxial co-crystals) may perform better (e.g., according to various measures) than a commercially available cable that uses EPDM as a high temperature material.

As an example, a cable may be constructed substantially according to an existing configuration that includes EPDM where at least some PFP is substituted for at least some of the EPDM. In such an example, the resulting cable may be optionally rated for use at a temperature above about 450 degrees F. (e.g., above about 232 degrees C.). As an example, the cable 500 and/or the cable 501 of FIG. 5 may include at least some PFP and/or at least some ECC PFP.

As an example, a round ESP cable can include one or more copper conductors, oil and heat resistant insulation (e.g., PFP and/or ECC PFP), a barrier layer (e.g., lead and/or PFP and/or ECC PFP), a jacket (e.g., optionally including at least some PFP and/or ECC PFP), and armor (e.g., galvanized or stainless steel or MONEL® alloy marketed by Inco Alloys International, Inc., Huntington, W. Va.). As another example, a flat ESP cable can include one or more copper conductors, oil and heat resistant insulation (e.g., PFP and/or ECC PFP), a barrier layer (e.g., lead and/or PFP and/or ECC PFP), a jacket layer (e.g., optionally including at least some PFP and/or ECC PFP), and armor (galvanized or stainless steel or MONEL® alloy marketed by Inco Alloys International, Inc., Huntington, W. Va.).

As an example, a polymer susceptible to hydrolysis may be coated on at least one side with a polymer composition that can undergo epitaxial co-crystallization or that has undergone, at least in part, some amount of such co-crystallization. As an example, a sealed cavity may include a polymer composition that can undergo epitaxial co-crystallization or that has undergone such co-crystallization to reduce introduction of moisture into the cavity where the cavity includes a polymer susceptible to hydrolysis. As an example, a polymer susceptible to hydrolysis may be polyimide or cyanate ester.

As an example, a power cable may include one or more strength members. In such an example, the added strength may be sufficient to allow the power cable to carry the weight of equipment to be powered. For example, the power cable may be for an ESP where the power cable includes at least one strength member and at least one material that includes a polymer composition that can undergo epitaxial co-crystallization or that has undergone such co-crystallization where the power cable may be used to lower the ESP system into a borehole, a well, etc. (e.g., a cable deployed ESP system). As an example, strength may be imparted to such a cable via two layers of external wrapped steel wire armor, for example, wrapped in opposite directions to balance torque.

As an example, a method may include a heat treatment for co-crystallization combined with a post cure cycle for one or more high temperature structural composites (e.g., cyanate esters, bismaleimide resins, epoxies, etc.). For example, a method may include one or more heat treatments where a heat treatment provides for one or more phenomena. As an example, a heat treatment may provide for co-crystallization and a post cure cycle.

As an example, a post-curing cycle (e.g., a combination of temperature and time exposure) may act to modify a three dimensional cross-linked structure (e.g., due to one or more rearrangement reactions). As an example, a post-curing cycle may be performed for one or more purposes, for example, to improve dimensional stability, improve heat and compressive creep resistance, drive off volatiles, etc.

As an example, where a co-extrusion process extrudes a first composition that can undergo epitaxial co-crystallization along with a second composition that can benefit from a post-curing cycle, a method may include applying heat treatment (e.g., or heat treatments) to achieve a desired amount of co-crystallization of the first composition and a desired amount of post-curing cycle benefits of the second composition. As an example, a first composition may include PFA and PTFE (e.g., LMW PTFE) and a second composition may include a polymer that may be susceptible to hydrolysis. As an example, a co-extruder may coat a second composition with a first composition, for example, such that the first composition forms a coating over a core or layer of the second composition. As an example, a product formed by such a co-extrusion process (e.g., or other technique) may be tape, a conductive cable, a component, etc. As an example, a process may coat one side or both sides of a planar layer. For example, an extruder may extrude a layer of material to coat one side of a planar layer of material. Such a process may be provided with the planar layer of material from a roll, as a co-extruded layer, as a previously extruded layer (e.g., extruders in series), etc. As an example, one material may be subject to hydrolysis where another material is not subject to hydrolysis. In such an example, one material may help protect the other from hydrolysis. For example, consider an epitaxial co-crystallized material protecting a material formed in part by a polyimide, a cyanate ester, etc.

As an example, an electric submersible pump motor can include a housing; and a hermetically sealed cavity defined at least in part by the housing that includes at least one material susceptible to hydrolysis, and a polymeric material that includes epitaxial co-crystals of perfluoroalkoxy (PFA) and polytetrafluoroethylene (PTFE). As an example, a PFA may be a polymer of tetrafluoroethylene and perfluorovinylether. As an example, a polymeric material may be a polymeric material formed from a melt-fabricable tetrafluoroethylene/perfluoro(alkyl vinyl ether) copolymer, where the perfluoroalkyl contains 1 to 5 carbon atoms, and melt flowable polytetrafluoroethylene.

As an example, an electric submersible pump motor may include dielectric oil disposed in a hermetically sealed cavity where the cavity also includes, for example, at least one material susceptible to hydrolysis and a polymeric material that includes epitaxial co-crystals of perfluoroalkoxy (PFA) and polytetrafluoroethylene (PTFE). As an example, a material susceptible to hydrolysis may be or include polyimide. As an example, a polymeric material may contact polyimide where the polymeric material includes epitaxial co-crystals of perfluoroalkoxy (PFA) and polytetrafluoroethylene (PTFE).

As an example, a motor slot liner film may be formed at least in part by polymeric material that includes epitaxial co-crystals of perfluoroalkoxy (PFA) and polytetrafluoroethylene (PTFE). As an example, an ESP motor may include a stator where, for example, a shaft of includes a rotor disposed in a hermetically sealed cavity. As an example, a hermetically sealed cavity may be sealed against entry of water vapor and, for example, include polymeric material that includes epitaxial co-crystals of perfluoroalkoxy (PFA) and polytetrafluoroethylene (PTFE).

As an example, a method may include providing a motor housing that defines, at least in part, a cavity; disposing in the cavity at least one material susceptible to hydrolysis and a polymeric material that includes perfluoroalkoxy (PFA) and polytetrafluoroethylene (PTFE); filling the cavity with dielectric oil; sealing the cavity; and heating the dielectric oil to a temperature of at least about 260 degrees C. to cause epitaxial co-crystallization of the PFA and the PTFE. In such an example, the method may include heating the dielectric oil to a temperature of at least about 280 degrees C. for at least about 4 hours. As an example, a method may include heating dielectric oil to a temperature of at least about 300 degrees C.

As an example, a material susceptible to hydrolysis may be or include polyimide. As an example, a polymeric material may contacts the polyimide where the polymeric material includes perfluoroalkoxy (PFA) and polytetrafluoroethylene (PTFE). As an example, a method may include forming motor slot liner film using at least in part a polymeric material that includes perfluoroalkoxy (PFA) and polytetrafluoroethylene (PTFE).

As an example, a method can include disposing a stator and a rotor in a housing. As an example, a method can include hermetically sealing a cavity defined at least in part by a housing against entry of water vapor.

As an example, a polyimide tape may be coated with a polymeric material that includes perfluoroalkoxy (PFA) and polytetrafluoroethylene (PTFE). In such an example, the polymeric material may include epitaxial co-crystals of PFA and PTFE.

As an example, one or more methods described herein may include associated computer-readable storage media (CRM) blocks. Such blocks can include instructions suitable for execution by one or more processors (or cores) to instruct a computing device or system to perform one or more actions.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 9:
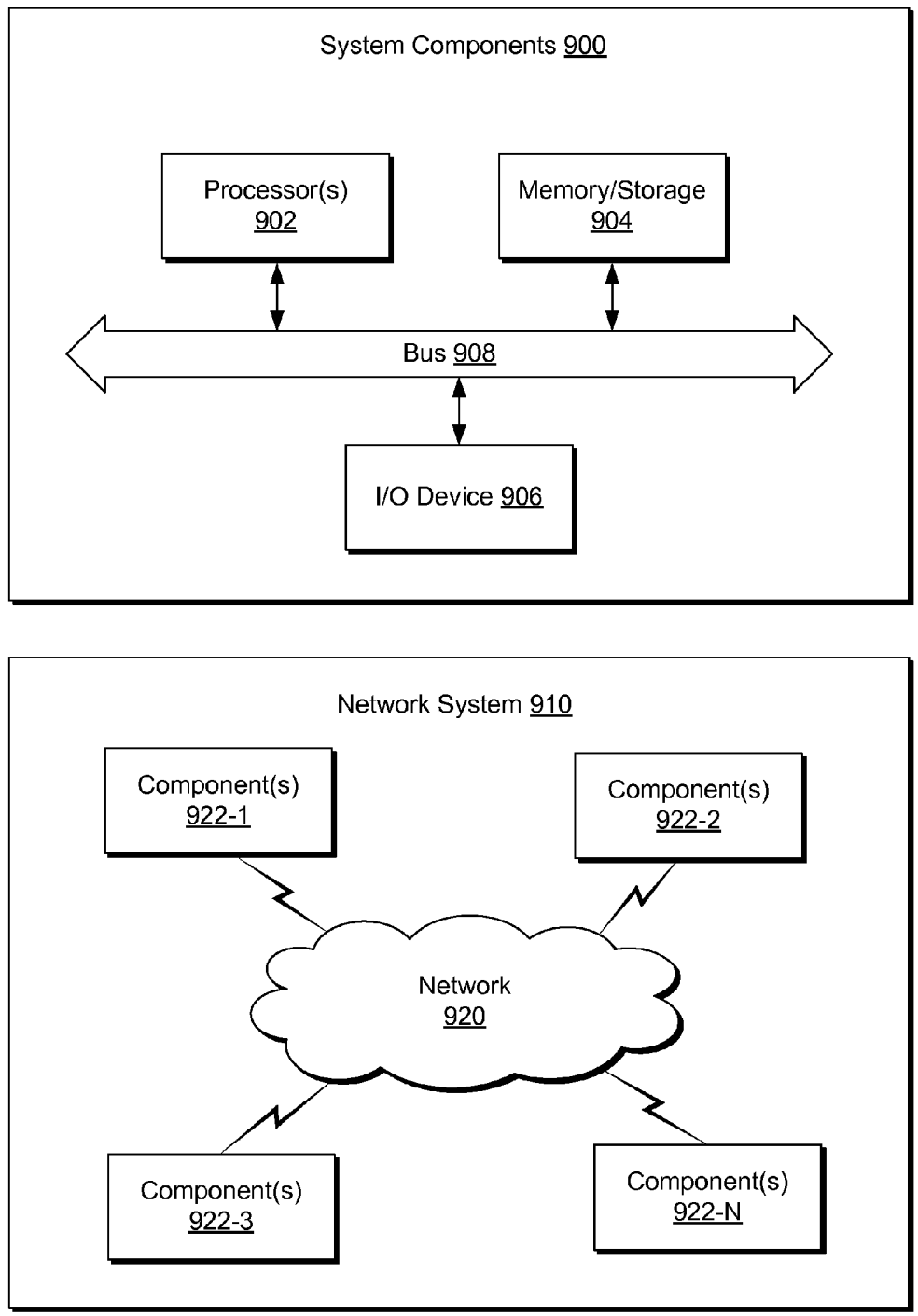
FIG. 9 illustrates example components of a system and a networked system.

FIG. 9 shows components of a computing system 900 and a networked system 910. The system 900 includes one or more processors 902, memory and/or storage components 904, one or more input and/or output devices 906 and a bus 908. According to an embodiment, instructions may be stored in one or more computer-readable media (e.g., memory/storage components 904). Such instructions may be read by one or more processors (e.g., the processor(s) 902) via a communication bus (e.g., the bus 908), which may be wired or wireless. The one or more processors may execute such instructions to implement (wholly or in part) one or more attributes (e.g., as part of a method). A user may view output from and interact with a process via an I/O device (e.g., the device 906). According to an embodiment, a computer-readable medium may be a storage component such as a physical memory storage device, for example, a chip, a chip on a package, a memory card, etc.

According to an embodiment, components may be distributed, such as in the network system 910. The network system 910 includes components 922-1, 922-2, 922-3, ... 922-N. For example, the components 922-1 may include the processor(s) 902 while the component(s) 922-3 may include memory accessible by the processor(s) 902. Further, the component(s) 902-2 may include an I/O device for display and optionally interaction with a method. The network may be or include the Internet, an intranet, a cellular network, a satellite network, etc.

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. An electric submersible pump motor comprising:
a housing; and
a hermetically sealed cavity defined at least in part by the housing that comprises
at least one material susceptible to hydrolysis, and
a polymeric material that comprises epitaxial co-crystals of perfluoroalkoxy (PFA) and polytetrafluoroethylene (PTFE).

2. The electric submersible pump motor of claim 1 wherein the PFA is a polymer of tetrafluoroethylene and perfluorovinylether.

3. The electric submersible pump motor of claim 1 wherein the polymeric material comprises a polymeric material formed from a melt-fabricable tetrafluoroethylene/perfluoro(alkyl vinyl ether) copolymer, wherein the perfluoroalkyl contains 1 to 5 carbon atoms, and melt flowable polytetrafluoroethylene.

4. The electric submersible pump motor of claim 1 comprising dielectric oil disposed in the hermetically sealed cavity.

5. The electric submersible pump motor of claim 1 wherein the at least one material susceptible to hydrolysis comprises polyimide.

6. The electric submersible pump motor of claim 5 wherein the polymeric material contacts the polyimide.

7. The electric submersible pump motor of claim 1 comprising motor slot liner film formed at least in part by the polymeric material.

8. The electric submersible pump motor of claim 1 comprising a stator.

9. The electric submersible pump motor of claim 8 comprising a shaft that comprises a rotor disposed in the hermetically sealed cavity.

10. The electric submersible pump motor of claim 1 wherein the hermetically sealed cavity is sealed against entry of water vapor.

* * * * *